US009071684B2

(12) United States Patent
Byron et al.

(10) Patent No.: US 9,071,684 B2
(45) Date of Patent: Jun. 30, 2015

(54) MEDIA FORKING

(75) Inventors: Janet Helen Byron, Hillsboro, NH (US); Mohammed Taher Shaikh, Fremont, CA (US); Vipin Palawat, Westford, MA (US); Paul Antinori, Harvard, MA (US); Mohanan Chalilputhenpurayil, Cupertino, CA (US); Rashad Azhar, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1144 days.

(21) Appl. No.: 12/620,166

(22) Filed: Nov. 17, 2009

(65) Prior Publication Data

US 2011/0116492 A1 May 19, 2011

(51) Int. Cl.
H04L 12/66 (2006.01)
H04M 3/42 (2006.01)
H04L 29/06 (2006.01)
H04M 3/51 (2006.01)
H04M 1/656 (2006.01)

(52) U.S. Cl.
CPC ........ *H04M 3/42221* (2013.01); *H04M 3/5183* (2013.01); *H04M 3/5175* (2013.01); *H04M 1/656* (2013.01); *H04M 3/5166* (2013.01); *H04L 65/1006* (2013.01); *H04L 65/1063* (2013.01); *H04L 65/1096* (2013.01); *H04L 65/103* (2013.01)

(58) Field of Classification Search
CPC . H04M 3/5175; H04M 3/5183; H04M 1/656; H04M 3/42221; H04M 3/2218; H04M 11/10; H04M 3/50; H04L 65/1003–65/1066; H04L 43/04; H04L 65/1069
USPC .................................................. 370/352–356
See application file for complete search history.

(56) References Cited

U.S. PATENT DOCUMENTS

| 2006/0014559 A1* | 1/2006 | Raman ........................ 455/550.1 |
| 2007/0064710 A1* | 3/2007 | Holmstrom et al. ........ 370/395.2 |
| 2008/0063167 A1* | 3/2008 | Rao et al. ................. 379/142.13 |
| 2008/0082669 A1* | 4/2008 | Williams et al. .............. 709/227 |
| 2010/0118865 A1* | 5/2010 | Jung et al. ..................... 370/352 |

* cited by examiner

*Primary Examiner* — Melanie Jagannathan
*Assistant Examiner* — Najeebuddin Ansari

(57) ABSTRACT

In an example embodiment, a Voice over IP (VoIP) system that provides for media forking at the caller's (ingress) gateway. The gateway receives data with a first address on a recording server for sending forked caller stream media and a second address on the recording server for sending forked called party stream media. The gateway sends forked media from the caller stream to the first address and forked media from the called party media to the second address. This provides a recording from the caller's perspective. By using this technique, the recording can include for example call transfer data and interactive voice response (IVR) data.

30 Claims, 14 Drawing Sheets

MEDIA FORKING

TECHNICAL FIELD

The present disclosure relates generally to streaming communications.

BACKGROUND

Telephone call recording may be desirable for several reasons. For example call recording may enable voice quality analysis to troubleshoot a network. Call recording may also be required for legal reasons such as lawful intercept. Two types of call recording may be employed, call data recording and call content recording. Call data recording includes recording call events, for example, recording when the call originated, when and by who a call is terminated, or if a call is forwarded elsewhere. This type of recording, also known as pen register, provides the phone number of both the person called and the person calling, along with call events and time-date stamps of when the events occurred. In contrast, call content includes the actual content of the call, i.e., the conversation that takes place, and may also include call data.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
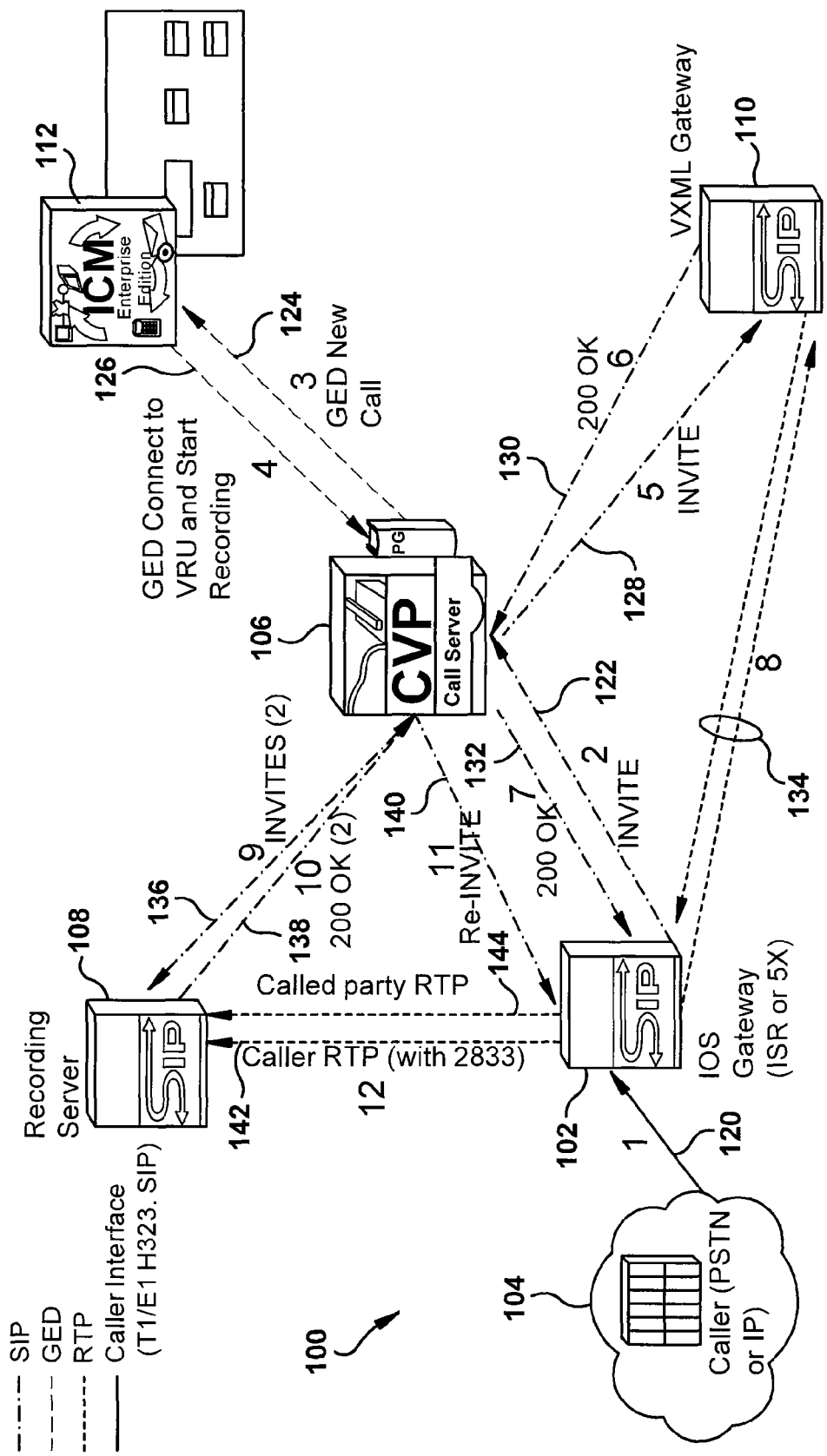
FIG. 1 illustrates an example of an Internet telephony system configured in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus, comprising an interface configured to send and receive data, and logic coupled to the interface. The logic is responsive to receiving data on the interface indicating a source is attempting to establish communications with a destination to send data to establish communications to a customer voice portal, wherein the data to establish communications comprises data indicating a media forking capability. The logic is responsive to receiving via the interface data requesting to enable media forking to reserve resources for media forking. The logic is responsive to receiving via the interface data representative of a first destination address for a recording server for a source media stream to fork the source media stream and send replicated packets of the source media stream to the first destination address. The logic is responsive to receiving via the interface data representative of a second destination address for a recording server for a destination media stream to fork the destination media stream and send replicated packets of the destination media stream to the second destination address In accordance with an example embodiment, there is disclosed herein an apparatus comprising an interface configured to send and receive data, and logic coupled to the interface. The logic is configured to receive a Session Initiation Protocol INVITE message via the interface from an ingress gateway to establish a call between a caller coupled to the ingress gateway and a called party. The logic forwards a new call request to intelligent contact management logic. The logic receives data from the intelligent contact management logic to connect a call between the caller and called party, the data from the intelligent contact management logic further comprising data with instructions to record the call. The logic is responsive to the data with instructions to record the call to select a recording server. The logic is responsive to selecting a selected recording server to send two Session Initiation Protocol (SIP INVITE messages to the selected recording server via the interface, the first SIP INVITE message requesting a first address for sending a caller stream for recording and the second SIP INVITE message requesting a second address for sending a called party stream for recording. The logic is responsive to receiving the first and second address for the caller and called party stream respectively to send a SIP RE-INVITE message via the interface to the ingress gateway, wherein the RE-INVITE message comprises three Session Description Protocol (SDP) m-lines, the first m-line comprising data representative of the called party SDP data, the second m-line comprising an Internet Protocol (IP) address, port and codec for the caller stream and the third m-line comprises an IP address, port and codec for the called party stream.

In accordance with an example embodiment, there is disclosed herein a method comprising receiving a call request from a caller attempting to establish a call with a called party. A Session Initiation Protocol (SIP) INVITE message to a Customer Voice Portal, the INVITE comprising data indicating a media forking capability is sent in response to receiving the call request. A SIP RE-INVITE message comprising Session Data Protocol (SDP) data comprising a first m-line with data representative of a first address on a recording server to receive a caller stream and a second m-line with data representative of a second address on the recording server to receive a called party stream is received. A caller media stream is forked and a replicated copy of packets for the caller media stream is sent to the first address on the recording server responsive to the SIP RE-INVITE message. A called party media stream is forked and a replicated copy of packets for the called party media stream is sent to the second address on the recording server responsive to the SIP RE-INVITE message.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment described herein is a Customer Voice Portal (CVP) recording feature (also referred to herein as "Media Forking") that provides an end-to-end Session Initiation Protocol (SIP) Voice over Internet Protocol (VoIP) recording mechanism for Interactive Voice Response (IVR) in a contact center environment. This feature allows calls to be recorded at the ingress gateway in the contact center environment. For example, the ingress tap point can be a TDM (Time division multiplexing) call from a caller arriving at a TDM gateway. The recording mechanism can record both the caller and called party audio streams (e.g. call agent, IVR, conferencing bridge, etc). The recording will reflect how the call was perceived by the caller, e.g., the recording reflects everything that the caller experienced during the call. Recording of the call can continue even during agent transfers and while processing interactive voice response signals. Recording may be controlled via a scripting environment and/or via an Agent Desktop using web services. Although the example embodiments herein are directed to a CVP environment, those skilled in the art should readily appreciate that the principles described herein are applicable to any Back-To-Back User Agent (B2BUA).

FIG. 1 illustrates an example of an Internet telephony system 100 configured in accordance with an example embodiment. The system comprises a Gateway server 102 configured to receive a call from a caller 104 which may be disposed on a network such as a Packet Switched Telephone Network (PSTN) or an Internet Protocol (IP) network. The operation of network 100 will be explained as follows.

Gateway 102 receives a call from a caller 104 represented by 120. As used herein, gateway 102 is an ingress gateway.

In response to the call, gateway 102 sends an SIP Invite 122 to Customer Voice Portal ("CVP" or call server) 106. In an example embodiment, the invite message comprises data indicating that gateway 102 has forking capabilities. In accordance with example embodiments, the following SIP headers may be employed to communicate forking capabilities:

Call-Info: <URL>;Purpose=X-enableforking; this message may be sent from the Customer Voice Portal (CVP) to the Internetwork Operating System (CVP→IOS) to instruct the IOS to reserve Digital Signal Processor (DSP) resources for potential simple forking during the call. Note that the header may include additional vendor specific data, for example a header for a Cisco call center may be formatted as Call-Info: <URL>;Purpose=X-cisco-enableforking; the below headers may also be similarly formatted.

Call-Info: <URL>;Purpose=X-enablesimpleforking; this message may be sent CVP→IOS to instruct the IOS to reserve DSP resources for potential simple forking during the call.

Call-Info: <URL>;Purpose=X-enablecomplexforking; this message may be sent CVP→IOS to instruct the IOS to reserve DSP resources for potential complex forking during the call.

Call-Info: <URL>;Purpose=X-disableforking; this message may be sent CVP→IOS to instruct the IOS that no more forking will be done in this call so that DSP resources can be freed.

Call-Info: <URL>;Purpose=X-forkingcapable; this message may be sent IOS→CVP to instruct the CVP that the gateway has forking capabilities.

Call-Info: <URL>;Purpose=X-nopassthrough; this message may be sent CVP→IOS to instruct the IOS that this RE-INVITE should not be passed through to the originating IP side.

CVP 106 notifies ICM (Intelligent Contact Management) 112 of the call as indicated by 124. In an example embodiment, ICM 112 suitably comprises logic that enables call agent management and call routing in a contact center environment. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software, which performs the functionality described herein when executed by a processor.

ICM 112 responds with a script that informs CVP 106 that the caller should be transferred to a (Voice Extensible Markup Language or Voice XML) VXML gateway 110 for Interactive Voice Response (IVR) treatment. IVR is a phone technology that allows a computer to detect voice and touch tones using a normal phone call. In addition, the script informs CVP 106 that recording will be used at some point in the call so that the IOS reserves sufficient DSP resources (the IOS needs to reserve DSP resources at the start of the call). In this example, the script further informs CVP 106 that recording is to begin immediately.

CVP 106 sends an INVITE to VXML gateway 110 as represented by 128. VXML gateway 110 responds with a SIP success "200 OK" message as represented by 130. In an example embodiment, the response from VXML gateway 110 may further comprise IP and port addresses. CVP 106 proxies the "200 OK" message from VXML gateway 110 to gateway 102. This establishes Real Time Protocol (RTP) streams between the caller 104, via gateway 102 and VXML gateway 110 as represented by 134.

CVP 106 selects a recording server 108 (or recording server proxy). The recording server selection will be based on the location of recording server 108 and gateway 102. The codec (not shown) configured on the selected recording server (recording server 108 in this example) will drive the codec selection. CVP 106 will send two separate SIP INVITE's represented by 136 to recording server 108 providing tagging data that would prove useful in helping the customer locate and process recordings at a later time. The following tagging data will be sent to the recording server. The tagging data may suitably comprise a call identifier (call id), codec, and possibly other data. Recording server 108 responds with two "200 OK" messages, the first message comprising data identifying an IP address and port for the near-end stream and the second message comprising data identifying the IP address and port for the far-end stream. As used in this example, because gateway 102 is the ingress gateway and recording is being performed at the ingress gateway, the near-end stream is the stream that is sent from gateway 102 (for example the stream sent from the caller to the called party) and the far-end stream is the stream that is received at the gateway (for example the stream from the called party to the caller).

CVP 106 sends a RE-INVITE, represented by 140 to gateway 102 comprising data representative of the IP address, port and codec on the recording server that is expecting to receive the caller's voice, and data representative of the IP address, port and codec on the recording server that is expecting to receive the called party's voice. The RE-INVITE may suitably incorporate one or more of the following SDP (Session Description Protocol) headers:

a=X-nearendforking: CVP→IOS Indicates that this m-line applies to the near-end of the call.
 a=X-farendforking: CVP→IOS Indicates that this m-line applies to the far-end of the call.
 a=X-mixedstreamforking: CVP→IOS Indicate that forking should occur as a mixed stream (both caller and called party mixed into a single RTP stream). Note that these headers may suitably comprise vendor specific data, for example a=X-cisco-nearendforking, a=X=cisco-farendforking, and/or X-cisco-mixed-streamforking.

For this example, the RE-INVITE CVP 106 sends to gateway 102 may suitably comprise the following 3 m-lines:
 a. The original m-line for the called party SDP with the original IP address, port and codec;
 b. An m-line with the IP address, port and codec on the recording server (server 108 in this example) that is expecting the receive the caller's stream (or caller's voice—e.g. a=X-cisco-nearend); and
 c. An m-line with the IP address, port and codec on the recording server that is expecting the receive the called party's stream (or called party's voice—e.g. a=X-cisco-farend).

In response to the RE-INVITE, gateway 102 forks two separate streams (such as RTP streams) to recording server 108. One stream 142 is the caller voice, one stream 144 is the called party's voice. Whenever the caller needs to be re-directed to a new transfer destination by CVP 106 (for example a new agent phone, VXML gateway, Music On Hold (MOH) server because of call transfer, conferencing, bridging, etc.), CVP 106 will send a SIP INFO message to recording server 108 with the following tagging data to enable recording server 108 to "bookmark" the recording with information pertaining to the life cycle of the call.

Figure 2:
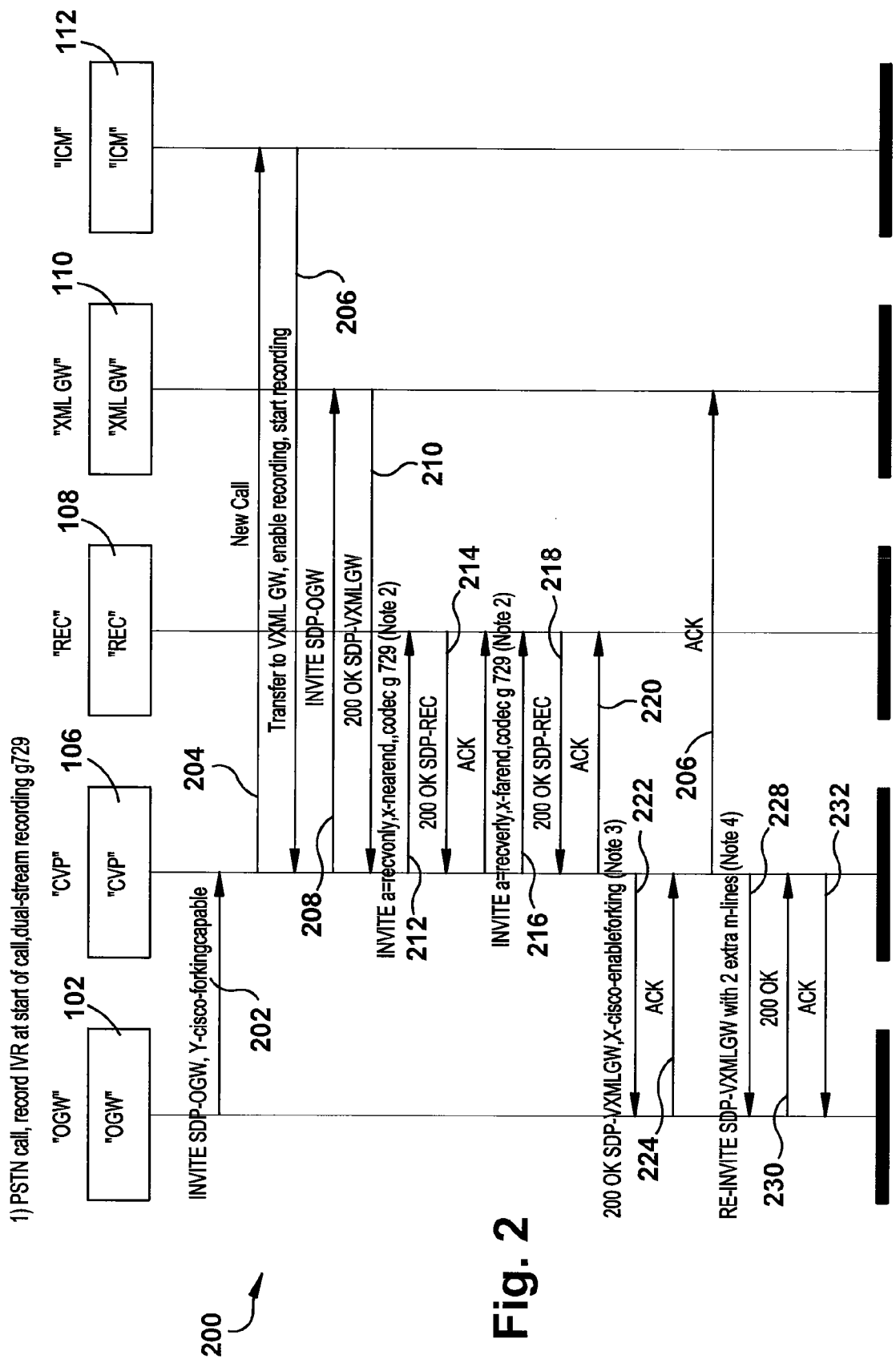
FIG. 2 is an example signal diagram for a call arriving from a Packet Switched Telephone Network to a Time Division Multiplexing gateway.

FIG. 2 is an example signal diagram 200 for a call arriving from a Packet Switched Telephone Network to a Time Division Multiplexing gateway. In this example, a packet switched telephone network (PSTN) call (or call request) is received by gateway 102. The call comprises data requesting to record Interactive Voice Response (IVR) at the start of the call, dual stream recording, with a g729 codec. Gateway 102 sends an INVITE message 202 to CVP 106. In the illustrated example, the INVITE message 202 is formatted as INVITE SDP-OGW, X-cisco-forkingcapable, indicating that gateway 102 is the originating gateway (OGW) for SDP and that gateway 102 has forking capabilities.

CPV 106 sends signal 204 to ICM 112 indicating a new call is being setup. ICM 112 responds with signal 206 to gateway 102 indicating gateway 102 should transfer the call to VXML gateway (VXML GW) 110, enable recording, and start recording.

CVP 106 sends an INVITE SDP-OGW 208 to VXML gateway 110. VXML gateway 110 responds with "200 OK" SDP-VXMLGW 210. This sets up RTP streams between gateway 102 and VXML gateway 110.

Two INVITE's 212, 216 are sent to recording server 108, one 212 for the caller stream and one 216 for the called party stream. For each INVITE, the recording server returns a "200 OK" with the IP address, port and codec (g729) on which the server will listen for the media represented by 214, 218 respectively. The caller's voice is received on the channel opened for the caller and the called party's voice on the channel opened for the called party. It is CVP's 106 responsibility to map those channels into the SDP that is sent to the OGW (originating) gateway 102 on the RE-INVITE. The codec selection is determined by the order of codec(s) configured on recording server 108. CVP 106 simply proxies the codec(s) to the ingress gateway 102 and the codec selected for the recording is negotiated between gateway 102 and recording server 108. CVP 106 sends an acknowledgement (ACK) 220 to indicate it received the IP address, port and codec for both streams (note that there may be more than one called party stream, e.g. a conference call, but for simplicity this example shows only one called party stream).

CVP 106 sends a "200 OK" signal 222 with the SDP of VXML gateway 110 to the gateway 102. X-cisco-enableforking is added as a SIP session header to signify that DSP resources need to be reserved for potential media forking in this call. Gateway 102 confirms receipt of signal 222 with ACK 224. CVP 106 sends ACK 226 to VXML gateway 110 responsive to receiving ACK 214.

CVP 106 sends a RE-INVITE 228 to gateway 102 (the originating gateway or OGW) containing the SDP of the VXML GW 110 plus two extra m-lines. In an example embodiment, A SIP session header of X-cisco-nopassthrough is also included to indicate to gateway 102 that this RE-INVITE should not be passed through (to the caller). A nopassthrough may be employed for signaling specific types of gateways. In this example, RE-INVITE 228 contains two extra m-lines (an example format of these m-lines is described herein supra) to convey the IP address, port and codec (g729 in this example) of the recording server listening ports. Gateway 102 responds with "200 OK" signal 230 and CVP 106 responds with ACK 232.

Figure 3:
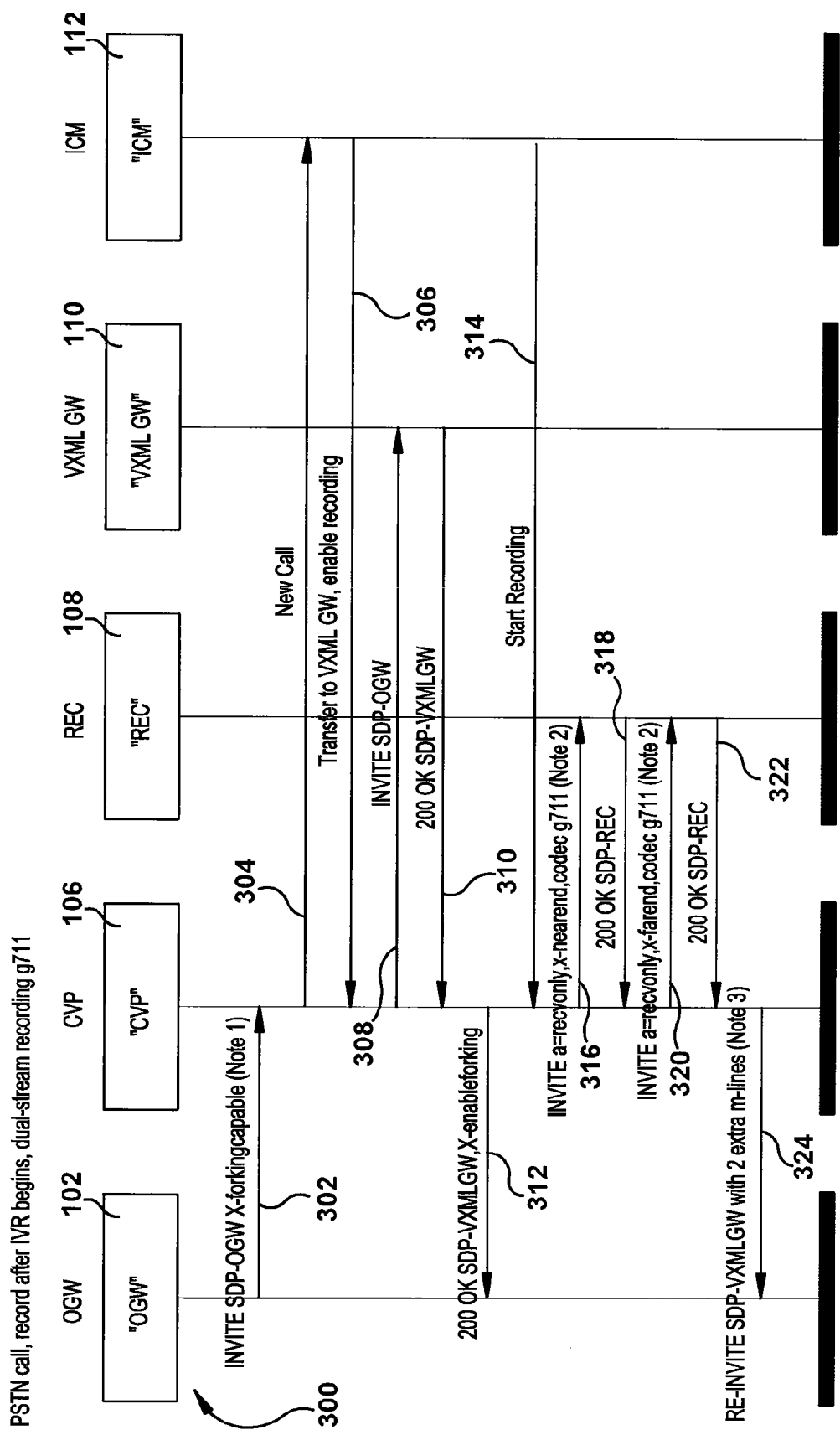
FIG. 3 is an example signal diagram for a call arriving from a Packet Switched Telephone Network to a Time Division Multiplexing gateway where recording begins during interactive voice response treatment.

FIG. 3 is an example signal diagram 300 for a call arriving from a Packet Switched Telephone Network to a Time Division Multiplexing gateway where recording begins during interactive voice response treatment. In this example, a packet switched telephone network (PSTN) call (or call request) is received by gateway 102. The call comprises data requesting to record after Interactive Voice Response (IVR) begins, dual stream recording, with a g711 codec. Gateway 102 sends an INVITE message 302 to CVP 106. In the illustrated example, the INVITE message 302 is formatted as INVITE SDP-OGW, X-cisco-forkingcapable, indicating that gateway 102 is the originating gateway (OGW) for SDP and that gateway 102 has forking capabilities.

CPV 106 sends signal 304 to ICM 112 indicating a new call is being setup. ICM 112 responds with signal 306 to gateway 102 indicating gateway 102 should transfer the call to VXML gateway (VXML GW) 110, enable recording, and start recording.

VCP 106 sends an INVITE SDP-OGW 308 to VXML gateway 110. VXML gateway 110 responds with "200 OK" SDP-VXMLGW 310. This sets up RTP streams between gateway 102 and VXML gateway 110.

CVP 106 then sends an INVITE SDP-OGW 308 to VXML gateway 110. VXML gateway 110 responds with "200 OK" DSP-VXMLGW signal 310. CVP 106 sends a "200 OK" signal 222 with the SDP of VXML gateway 110 to the gateway 102. X-cisco-enableforking is added as a SIP session header to signify that DSP resources need to be reserved for potential media forking in this call.

ICM 112 then sends signal 314 to CVP 106 to start recording. In response to signal 314, two INVITE's 316, 320 are sent to recording server 108, one invite 316 for the caller stream and one invite 320 for the called party stream. For each INVITE, the recording server returns a "200 OK" with the IP address, port and codec (g711) on which the server will listen for the media represented by 318, 322 respectively. The caller's voice is received on the channel opened for the caller and the called party's voice on the channel opened for the called party.

CVP 106 sends a RE-INVITE 324 to gateway 102 (the originating gateway or OGW) containing the SDP of the VXML GW 110 plus two extra m-lines. In this example, RE-INVITE 228 contains two extra m-lines (an example format of these m-lines is described herein supra) to convey the IP address, port and codec (g711 in this example) of the recording server listening ports.

Figure 4:
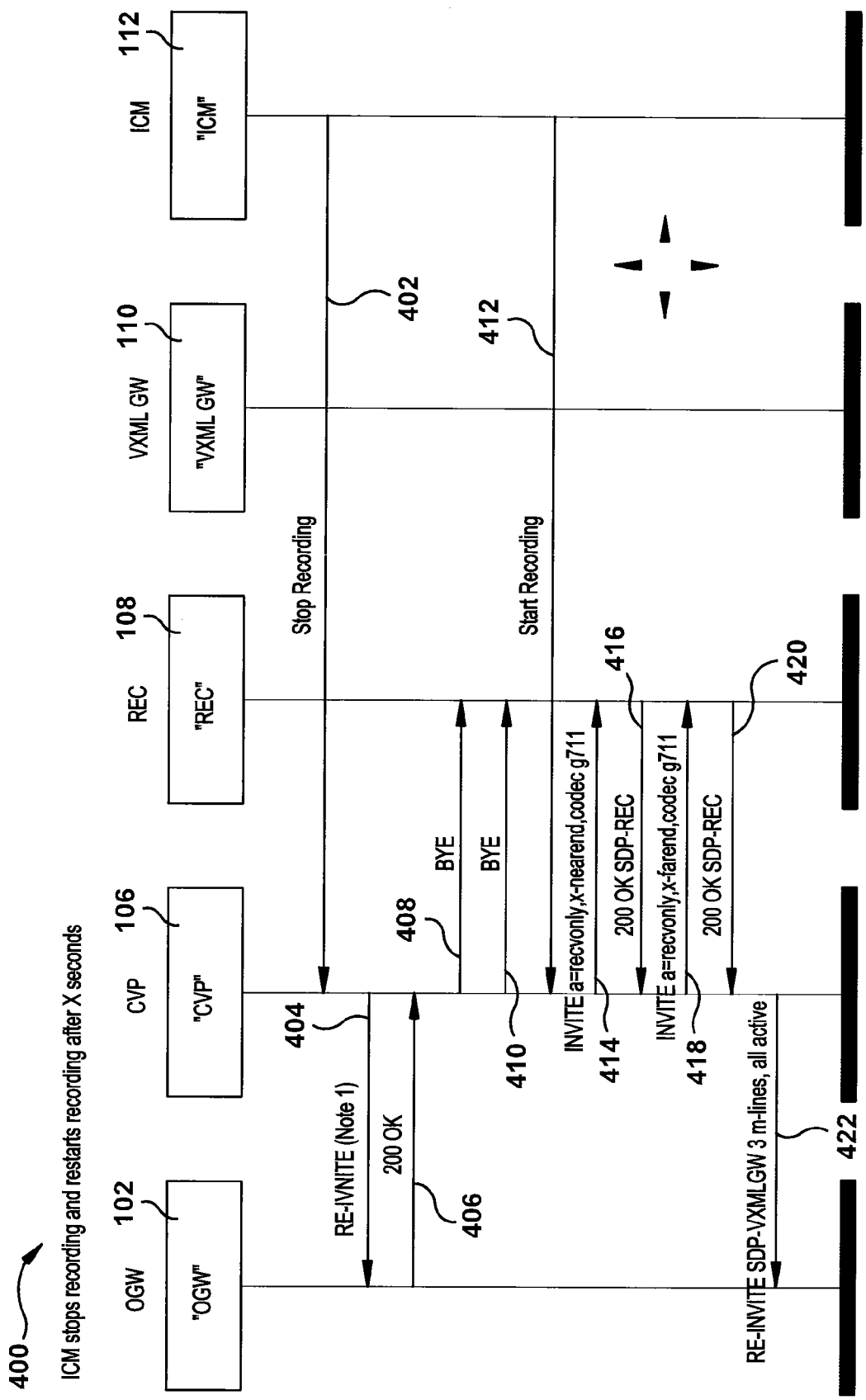
FIG. 4 is an example signal diagram for responding to a request to stop recording and restart recording.

FIG. 4 is an example signal diagram 400 for responding to a request to stop recording and restart recording. The call may have been setup as illustrated in FIG. 3, FIG. 4, or any other suitable procedure.

ICM 112 signals 402 CVP 106 to stop recording. CVP 102 then sends a RE-INVITE 404 to gateway 102. Re-INVITE 404 contains 3 m-lines. The first m-line for the original media stream to the VXML GW (VXML gateway 110 in this example) will remain unchanged. The next 2 m-lines for the recording server media streams will both be marked as a=inactive. Gateway 102 responds with "200 OK" signal 406. CVP 106 sends SIP BYE messages 408, 410 (one for each call leg) to recording server 108. The BYE messages instruct recording server 108 to stop recording. In an example embodiment, recording server 108 closes the recording file (for example a way file) and opens a new file when recording is restarted.

ICM 112 signals 412 CVP 106 to begin recording. In response to signal 412, two INVITE's 414, 418 are sent to recording server 108, one invite 414 for the caller stream and one invite 418 for the called party stream. For each INVITE, the recording server returns a "200 OK" with the IP address, port and codec (g711) on which recording server 108 will listen for the media represented by 416, 420 respectively. The caller's voice is received on the channel opened for the caller and the called party's voice on the channel opened for the called party. CVP 106 sends RE-INVITE 422 to gateway 102 with three m-lines. The first m-line for the original media stream to VXML gateway 110 is unchanged from the original call setup, the other two m-lines containing data with the IP address, port and codec to send each stream to recording server 108.

Figure 5:
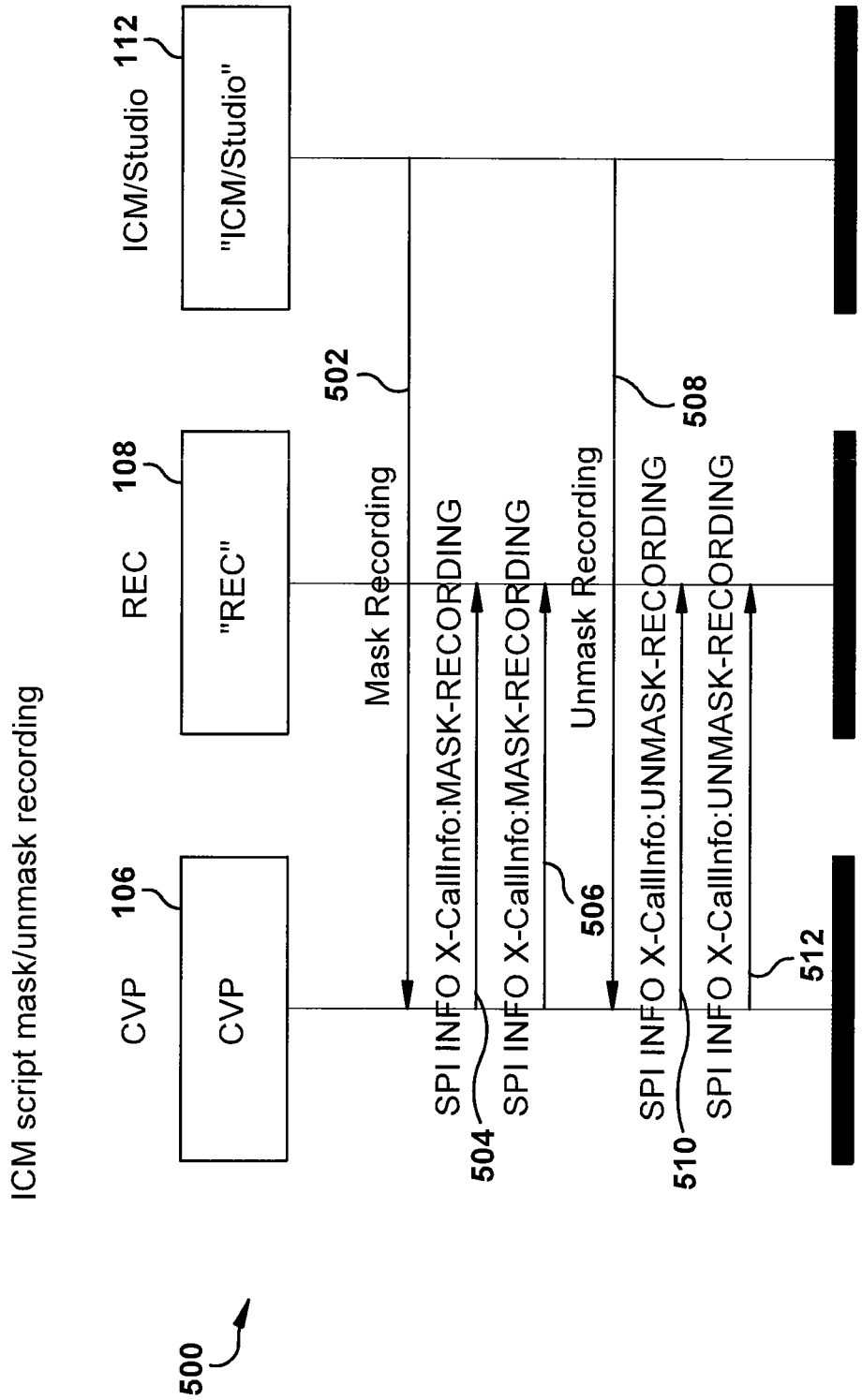
FIG. 5 is an example signal diagram to mask/unmask a recording.

FIG. 5 is an example signal diagram 500 to mask/unmask a recording. The call may have been setup as illustrated in FIG. 3, FIG. 4, or any other suitable procedure. In this example call flow, the recording server is told to mask recording with a SIP INFO-MASK-RECORDING to each call leg to recording server 108. A tone overlays the caller's voice and the called person's voice so that a person reviewing a recorded file can determine that this section of the recording contained sensitive data and was intentionally masked to protect the caller's confidentiality. This procedure may be used to mask the caller's voice, or to mask other sensitive data such as a Dual-Tone Multi-Frequency (DTMF) key input (for example a caller may use a DTMF input to enter a password). Because recording is not stopped, a single file is maintained.

ICM 112 sends signal 502 to instruct CVP 106 to mask recording. In response, CVP 106 sends to SIP INFO-MASK-RECORDING signals 504, 506 to recording server 108. One signal is sent for each stream being recorded (near-end and far-end in this example but in conference calls a signal may be sent for the near-end and each far-end). During this time, recording server 108 inserts a tone into the recording file.

ICM 112 sends signal 508 to instruct CVP 106 to unmask recording. In response, CVP 106 sends SIP UNMASK-RECORDING signals 510, 512 to recording server 108. One signal is sent for each stream being recorded (for example one for near-end and one for far-end). Recording server 108 resumes recording responsive to receiving signals 510, 512.

Figure 6:
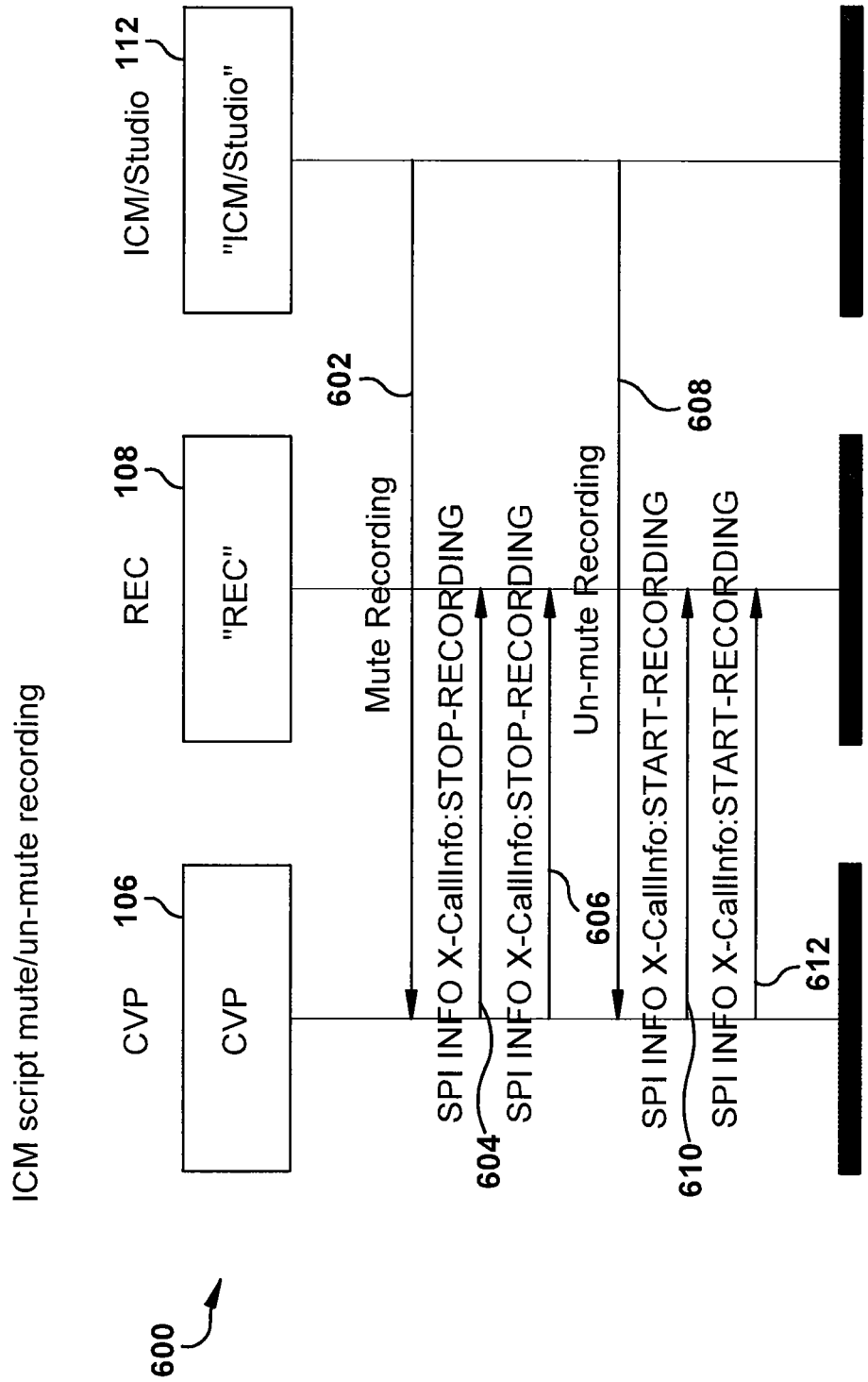
FIG. 6 is an example signal diagram to mute/un-mute a recording.

FIG. 6 is an example signal diagram 600 to mute/un-mute a recording. In this example, recording server 108 is told to mute recording with a SIP INFO STOP-RECORDING message for each call leg. A listener reviewing the recorded file will hear a period of brief silence during the muted portion. In an example embodiment, two physical recording files will be created. The silence is not recorded but instead the silence is injected during playback of the recording.

ICM 112 sends signal 602 to instruct CVP 106 to mute recording. In response, CVP 106 sends to SIP INFO-STOP-RECORDING signals 604, 606 to recording server 108. One signal is sent for each stream being recorded (near-end and far-end in this example but in conference calls a signal may be sent for the near-end and each far-end). In an example embodiment, recording server closes the recording file and will open a new file responsive to receiving a SIP INFO-START-RECORDING message.

ICM 112 sends signal 608 to instruct CVP 106 to un-mute recording. In response, CVP 106 sends SIP START-RECORDING signals 610, 612 to recording server 108. One signal is sent for each stream being recorded (for example one for near-end and one for far-end). Recording server 108 resumes recording responsive to receiving signals 610, 612.

Figure 7:
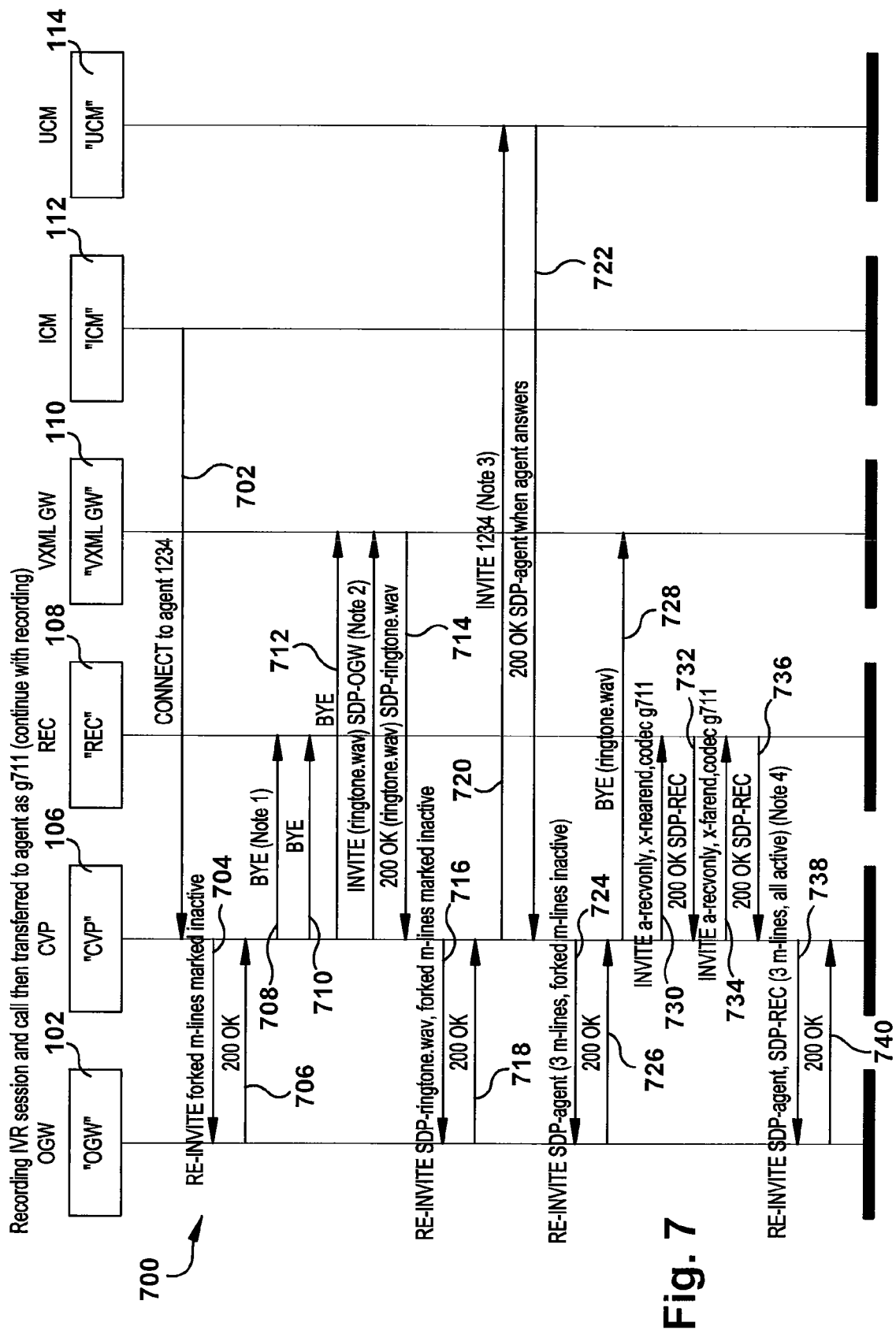
FIG. 7 is an example signal diagram for a transfer call that is being recorded from a first call agent to a second call agent and to continue recording.

FIG. 7 is an example signal diagram 700 to transfer a call that is being recorded transferred from a first call agent to a second call agent and to continue recording the call after the transfer. This example assumes a call is already in progress (for example was setup as in FIG. 3) and continues from the end of signal diagram 300 (FIG. 3).

ICM 112 signals CVP 106 to connect to agent (1234 in this example) via signal 702. In response, CVP 106 sends RE-INVITE signal 704 to gateway 102. RE-INVITE signal 704 contains data informing gateway 102 that recording is inactive (for example by inserting m-lines a=inactive). Gateway 102 responds with "200 OK" 706. CVP 106 sends SIP BYE messages 708, 710 (one for each recording) to recording server 108. These tell recording server 108 to stop recording. In this example, recording will start after the caller has been connected to the agent. In an example embodiment, CVP 106 will record a ringtone (e.g. ringtone.wav).

Because SIP currently provides no inherent method of playing a mid-call ringtone to the caller after the initial "200 OK", in an example embodiment, CVP 106 invites VXML gateway 110 to play the wave file (ringtone.wav). CVP 106 sends INVITE 712 to VXML gateway 110. INVITE 712 contains the wave file (ringtone.wav) to play and informs VXML gateway 110 that the originating gateway (SDP-OGW) is gateway 102. VXML gateway 110 responds with "200 OK" 714 and the SDP ringtone.wav. CVP 106 sends RE-INVITE 716 to gateway 102 with the ringtone file (ringtone.wav) and data informing gateway 102 to reserve capacity for media forking and that recording is inactive. Gateway 102 responds with "200 OK" 718.

CVP 106 sends INVITE 720 to the Unified Call Manager (UCM) 114 to invite the new agent. UCM 114 may be any suitable call manager (or other IP-PBX gateway), such as for example a Cisco Unified Call Manager (CUCM) available from Cisco Systems, Inc. 170 West Tasman Dr., San Jose, Calif. 95134. UCM 114 responds with "200 OK" 722 along with data about the agent (SDP-agent) when the answers the call.

CVP 106 sends RE-INVITE 724 (SDP-Agent) to gateway 102 responsive to the new agent answering. RE-INVITE 724 also contains data indicating that recording is still inactive (for example forked m-lines inactive). Gateway 102 responds with "200 OK" 726. CVP 106 then sends SIP BYE 728 to VXML gateway 110 to turn off the mid-call ringtone.

CVP 106 sends two INVITE's 730, 734 to recording server 108, one invite 730 for the caller stream and one invite 734 for the called party stream. For each INVITE, the recording server returns a "200 OK", 732, 736 respectively, with the codec (g711) for the call.

CVP 106 sends a RE-INVITE 738 to gateway 102 (the originating gateway or OGW) containing the SDP of the VXML GW 110 plus two extra m-lines. In this example, RE-INVITE 228 contains two extra m-lines (an example format of these m-lines is described herein supra) to convey the IP address, port and codec (g711 in this example) of the recording server listening ports. Note in this example that when the new agent answers, CVP 106 sends a RE-INVITE 724 to gateway 102 with the SDP for the new agent and then separately sends a RE-INVITE 738 with the SDP for the recording server. Although gateway 102 could process all the SDP changes at one time (adjusting the main stream before creating the forked streams), it is cleaner if CVP 106 sends two separate Re-invites 724, 738. If only one re-invite had been sent and gateway returns an error code, CVP 106 would not know whether the error code was for the main voice channel or the recording. Two separate re-invites allows CVP 106 to treat the main channel RE-INVITE 724 separately from the recording RE-INVITE 738.

Figure 8:
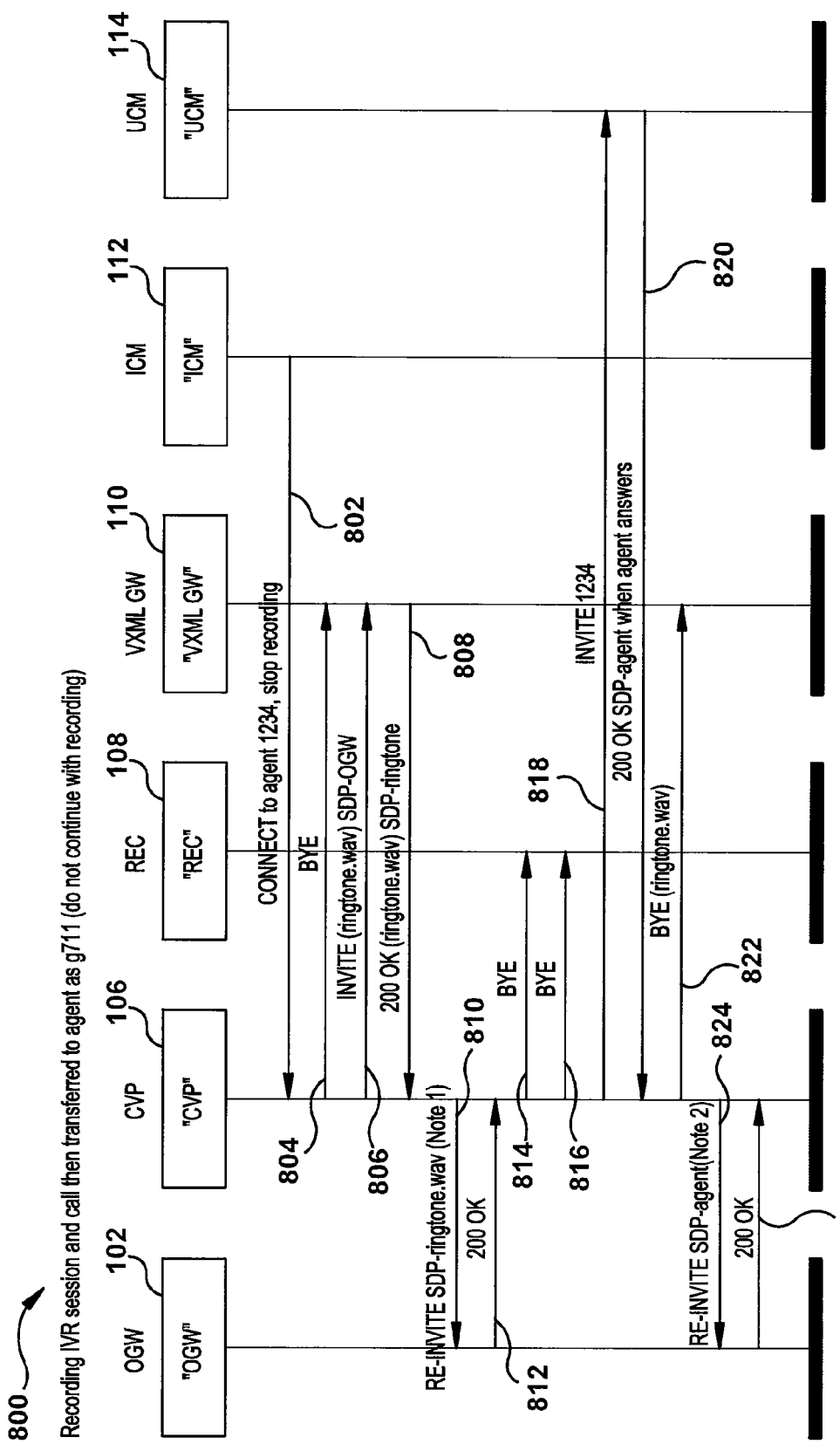
FIG. 8 is an example signal diagram to transfer a call that is being recorded from a first call agent to a second call agent and to discontinue recording.

FIG. 8 is an example signal diagram 800 to transfer a call that is being recorded from a first call agent to a second call agent and to discontinue recording. This example assumes a call is already in progress (for example was setup as in FIG. 3) and continues from the end of signal diagram 300 (FIG. 3).

ICM 112 signals CVP 106 to connect to agent (1234 in this example) and stop recording via signal 802. CVP 106 responds by sending BYE 804.

Because SIP currently provides no inherent method of playing a mid-call ringtone to the caller after the initial "200 OK", in an example embodiment, CVP 106 invites VXML gateway 110 to play the wave file (ringtone.wav). CVP 106 sends INVITE 806 to VXML gateway 110. INVITE 806 contains the wave file (ringtone.wav) to play and informs VXML gateway 110 that the originating gateway (SDP-OGW) is gateway 102. VXML gateway 110 responds with "200 OK" 808 with SDP ringtone.wav. CVP 106 sends RE-INVITE 810 to gateway 102 with the ringtone file (ringtone.wav). In addition, RE-INVITE 810 contains data instructing gateway 102 that recording is inactive (e.g. two SDP m-lines with a=inactive) Gateway 102 responds with "200 OK" 812.

CVP 106 sends SIP BYE messages 814, 816 (one for each recording) to recording server 108. These tell recording server 108 to stop recording.

CVP 106 sends INVITE 818 to the Unified Call Manager (UCM) 114 to invite the new agent. UCM 114 may be any suitable call manager (or other IP-PBX gateway), such as for example a Cisco Unified Call Manager (CUCM) described herein supra. UCM 114 responds with "200 OK" 820 along with data about the agent (SDP-agent) when the answers the call. CVP 106 sends BYE 822 to VXML gateway 110 to terminate the ringtone.

CVP 106 sends RE-INVITE 824 (SDP-Agent) to gateway 102 responsive to the new agent answering. RE-INVITE 824 contains data indicating that recording is still inactive (for example forked m-lines inactive). Gateway 102 responds with "200 OK" 826.

Figure 9:
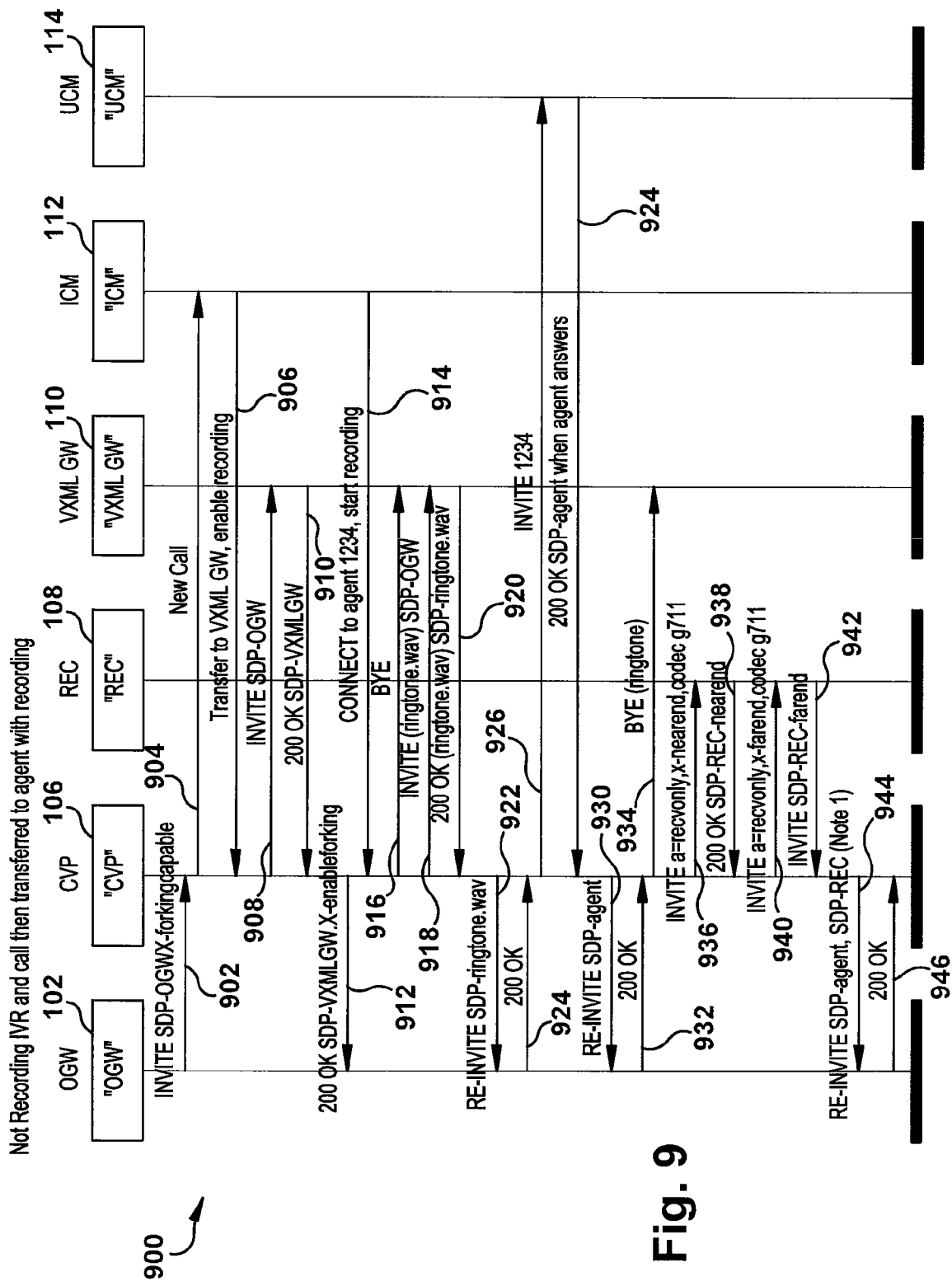
FIG. 9 is an example signal diagram to transfer a call that is not being recorded from a first call agent to a second call agent and to initiate recording.

FIG. 9 is an example signal diagram 900 for a call that is not being recorded to be transferred from a first call agent to a second call agent and to initiate recording. A call from a caller (not shown, see e.g. 104 in FIG. 1) is received at gateway 102 which sends an INVITE 902 to CVP 106. INVITE 902 contains data indicating that gateway 102 has media forking capabilities (SDP-OGW X-forkingcapable). CVP signals a new call 904 to ICM 112. ICM 112 sends signal 906 to CVP 106 to transfer to VXML gateway 110 and enable call recording.

CVP 106 sends INVITE 908 to VXML gateway 110. INVITE 908 contains data indicating the originating gateway (gateway 102 in this example—SDP-OGW). VXML gateway 110 signals "200 OK" 910 to CVP 106. Signal 910 may suitably comprise data identifying VXML gateway 110 (SDP-VXML GW). CVP 106 completes the call by sending signal 912 "200 OK" to gateway 102. Signal 912 may contain data (SDP-XMLGW, X-enableforking) to setup a stream (such as an RTP stream) between gateway 102 and VXML gateway 110 as well as data instructing gateway 102 to reserve resources for media forking.

Transfer of the call is initiated by ICM 112 sending a CONNECT signal 914 to CVP 106. CVP 106 initiates a mid-call ringtone being sent to the caller by inviting VXML gateway 110 to play the wave file (ringtone.wav). CVP 106 sends INVITE 916 to VXML gateway 110. INVITE 916 contains the wave file (ringtone.wav) to play and informs VXML gateway 110 that the originating gateway (SDP-OGW) is gateway 102. VXML gateway 110 responds with "200 OK" 920 with SDP ringtone.wav. CVP 106 sends RE-INVITE 922 to gateway 102 with the ringtone file (ringtone.wav) so that gateway 102 can receive the ringtone. Gateway 102 responds with "200 OK" 924.

CVP 106 sends INVITE 926 to the Unified Call Manager (UCM) 114 to invite the new agent. UCM 114 may be any suitable call manager (or other IP-PBX gateway), such as for example a Cisco Unified Call Manager (CUCM) described herein supra. UCM 114 responds with "200 OK" 928 along with data about the agent (SDP-agent) when the answers the call.

CVP 106 sends RE-INVITE 930 (SDP-Agent) to gateway 102 responsive to the new agent answering. Gateway 102 responds with "200 OK" 932. CVP 106 then sends SIP BYE 934 to VXML gateway 110 to turn off the mid-call ringtone.

CVP 106 sends two INVITE's 936, 940 to recording server 108, one invite 936 for the caller stream and one invite 940 for the called party stream. For each INVITE, the recording server returns a "200 OK", 938, 942 respectively, with the codec (g711) for the call.

CVP 106 sends a RE-INVITE 944 to gateway 102 (the originating gateway or OGW) containing the SDP of the new agent and data representative of the IP address, port and codec of the recording server (server 110) to send the forked streams. Note in this example that when the new agent answers, CVP 106 sends a RE-INVITE 930 to gateway 102 with the SDP for the new agent and then separately sends a RE-INVITE 944 with the SDP for the recording server. Although gateway 102 could process all the SDP changes at one time (adjusting the main stream before creating the forked streams), it is cleaner if CVP 106 sends two separate Re-invites 930, 944. If only one RE-INVITE had been sent and gateway returns an error code, CVP 106 would not know whether the error code was for the main voice channel or the recording. Two separate re-invites allows CVP 106 to treat the main channel RE-INVITE 930 separately from the recording RE-INVITE 944. Gateway server responds with "200 OK" signal 946.

Figure 10:
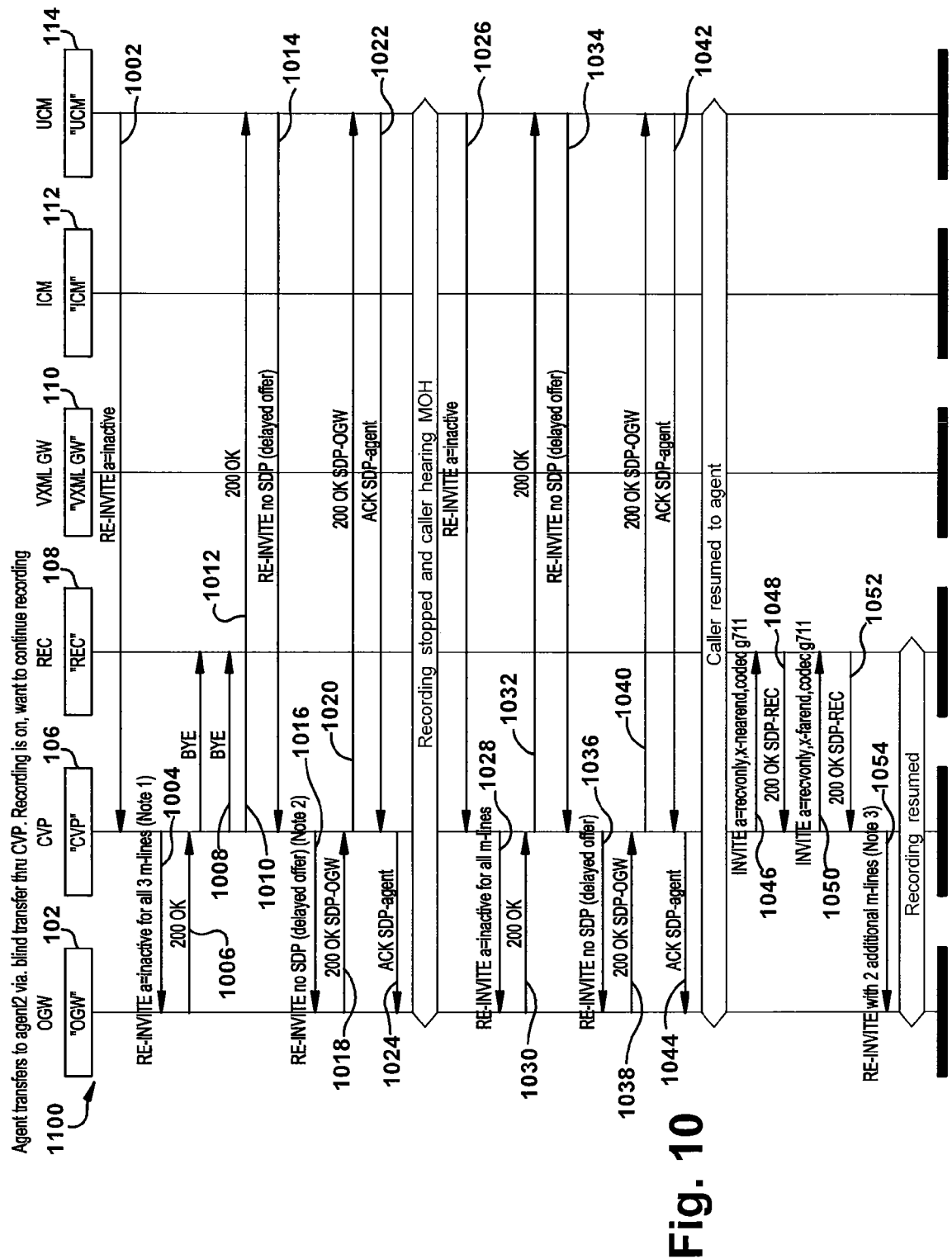
FIG. 10 is an example of a signal diagram implemented when an agent puts a caller on hold during a recorded call.

FIG. 10 is an example of a signal diagram 1000 implemented when an agent puts a caller on hold during a recorded call. In this example, when the agent puts the caller on hold, the caller hears Music On Hold (MOH). Recording resumes when the agent returns to the call.

UCM 114 signals CVP 106 that the call has been placed on hold by sending RE-INVITE 1002. RE-INVITE 1002 also contains data (a=inactive) indicating that recording should stop. CVP 106 sends RE-INVITE 1004 to gateway 102. RE-INVITE 1004 sends data (for example a=inactive for all m-lines) indicating that the media is inactive and to close the caller channel to the agent. CVP 106 will tell the recording server to stop (SIP BYE signals 1008, 1010) since there is no media to be recorded. Gateway 102 responds to RE-INVITE 1004 with "200 OK" signal 1006. CVP 106 sends "200 OK" signal 1012 to UCM 114.

UCM 114 sends RE-INVITE signal 1014 to CVP 106 (no SDP—delayed offer). In order for the gateway to respond with SDP, CVP 106 has to proxy through the delayed offer as is with no m-lines, even though this technically this violates the m-line rule. Thus, CVP 106 sends RE-INVITE 1016 (no SDP—delayed offer) to gateway 102. Gateway 102 responds with "200 OK" signal 1018 with SDP-OGW (originating gateway). CVP 106 sends "200 OK" signal 1020 with SDP-OGW to UCM 114. UCM 114 responds with an acknowledgement (ACK) signal 1022 with SDP-MOH (Session Description Protocol data for Music On Hold server). CVP 106 sends ACK 1024 with SDP-MOH to gateway 102. At this point, recording stops and the caller hears Music on Hold.

When the called party resumes the call, RE-INVITE 1026 to CVP 106. CVP is responsive to send RE-INVITE (a=inactive for all m-lines because recording is currently inactive) 1028 to gateway 102. Gateway 102 responds with "200 OK" signal 1030 to CVP 106, which sends "200 OK" signal 1032 to UCM 114.

UCM 114 sends RE-INVITE 1034 (with no SDP—or a delayed offer) to CVP 106. CVP 106 is responsive to RE-INVITE 1034 to send RE-INVITE 1036 (with no SDP—or a delayed offer) to gateway 102. Gateway 102 responds with "200 OK" signal 1038 with SDP data for gateway 102. CVP 106 sends "200 OK" signal 1040 with SDP data for gateway 102 to UCM 114. UCM 114 responds by sending ACK signal 1042 with SDP-agent data to CVP 106. CVP 106 responds to ACK signal 1042 by sending ACK signal 1044 to gateway 102 with SDP-agent data. At this point the call between the caller and agent has resumed.

CVP 106 sends INVITE 1046 to recording server 108 to obtain an address on the recording server to receive the caller (near-end) stream along with data indicating in this example the near-end codec is a g711 codec. Recording server responds with "200 OK" message 1048 that comprises data representative of the IP address, port and codec for the caller stream.

CVP 106 sends INVITE 1050 to recording server 108 to obtain an address on the recording server to receive the called party (far-end) stream along with data indicating in this example the far-end codec is a g711 codec. Recording server responds with "200 OK" message 1052 that comprises data representative of the IP address, port and codec for the called party stream.

CVP 106 sends RE-INVITE 1054 to gateway 102 with the address on the recording server that is to receive the caller (near-end) stream and the address on the recording server that is to receive the called party (far-end) stream. Gateway 102 resumes sending a replicated copy of the streams to recording server 108 responsive to receiving RE-INVITE 1054. At this point recording of the call resumes.

Figure 11:
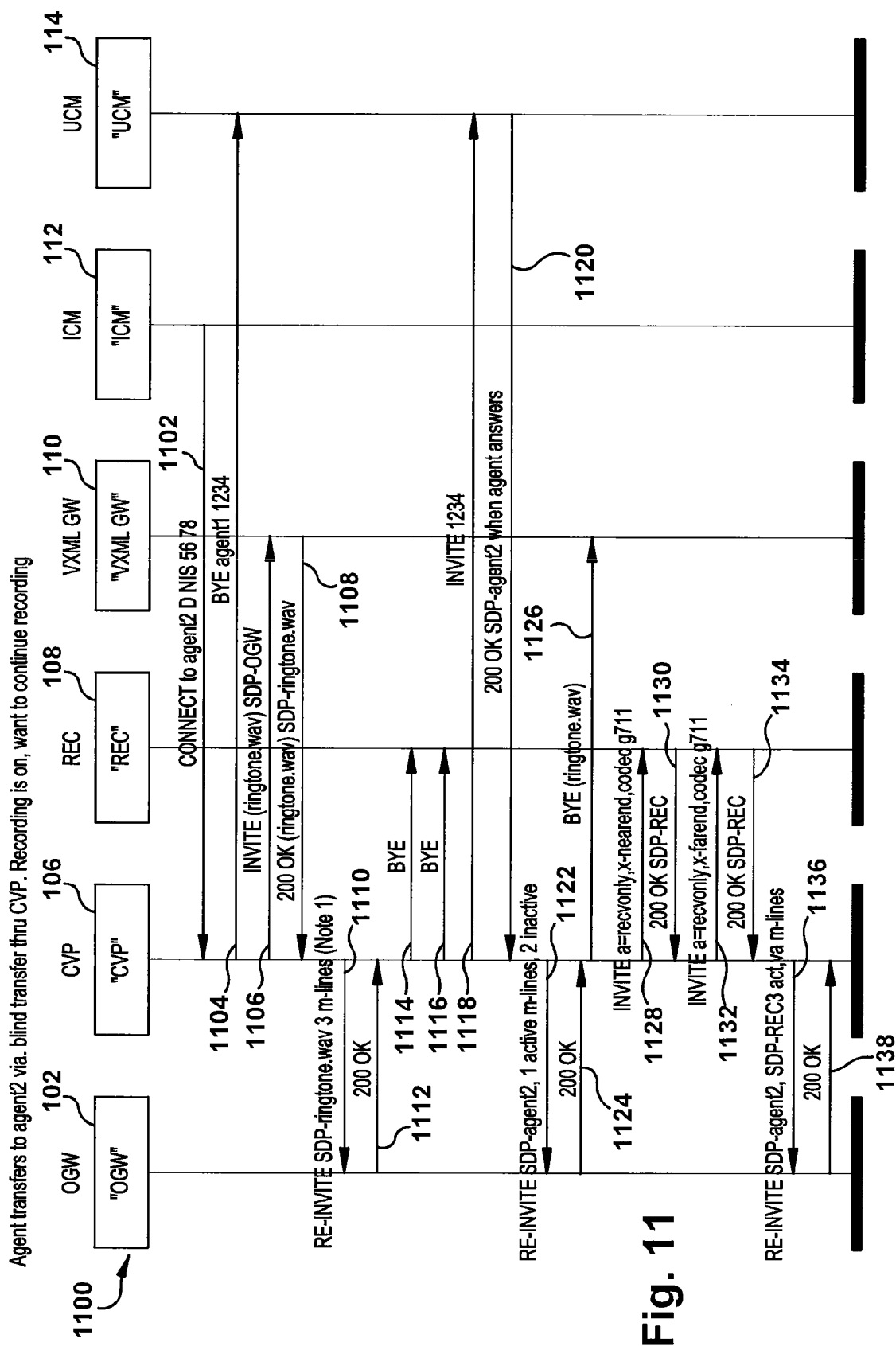
FIG. 11 is an example of a signal diagram illustrating signals exchanged when a first agent blind transfers a call to a second agent and the caller wants to continue recording.

FIG. 11 is an example of a signal diagram 1100 illustrating signals exchanged when a first agent blind transfers a call to a second agent and the caller wants to continue recording. This illustration assumes that a call between the caller and first agent has already been established.

ICM 112 signals CVP 106 to connect to the second agent (agent 2 in this example) via signal 1102. CVP 106 responds with a BYE to the first agent (agent 1234 in this example) to UCM 114.

CVP 106 invites VXML gateway 110 to play the wave file (ringtone.wav) so that the caller hears a ring tone. CVP 106 sends INVITE 1106 to VXML gateway 110. INVITE 1106 contains the wave file (ringtone.wav) to play and informs VXML gateway 110 that the originating gateway (SDP-OGW) is gateway 102. VXML gateway 110 responds with "200 OK" 1108 and the SDP ringtone.wav. CVP 106 sends RE-INVITE 716 to gateway 102 with the ringtone file (ringtone.wav) and data informing gateway 102 that the forked media is inactive (for example by including 2 inactive m-lines in SDP data, e.g. a=inactive). Gateway 102 responds with "200 OK" signal 1112. CVP 106 sends to BYE signals 1114, 1116 to recording server 108 to turn off recording while the call is transferred.

CVP 106 sends INVITE 1118 to the Unified Call Manager (UCM) 114 to invite the second agent. UCM 114 responds with "200 OK" 1120 along with data about the agent (SDP-agent2) when the second agent answers the call.

CVP 106 sends RE-INVITE 1122 (SDP-Agent) to gateway 102 responsive to the new agent answering. In this example, RE-INVITE 1122 also contains data indicating that recording is still inactive (for example forked m-lines inactive). Gateway 102 responds with "200 OK" 1124. CVP 106 then sends SIP BYE 1126 to VXML gateway 110 to turn off the mid-call ringtone.

CVP 106 sends two INVITE's 1128, 1132 to recording server 108, one invite 1128 for the caller stream and one invite 1132 for the called party stream. For each INVITE, the recording server returns a "200 OK", 1130, 1134 respectively. In addition, signals 1130, 1134 may include data indicating the IP address, port and codec for the call (SDP-REC).

CVP 106 sends a RE-INVITE 1136 to gateway 102 (the originating gateway or OGW) containing data (for example SDP-agent2, SDP-REC, 3 active m-lines) to instruct gateway 102 to commence media forking. Gateway 102 acknowledges the RE-INVITE by sending "200 OK" 1138.

Figure 12:
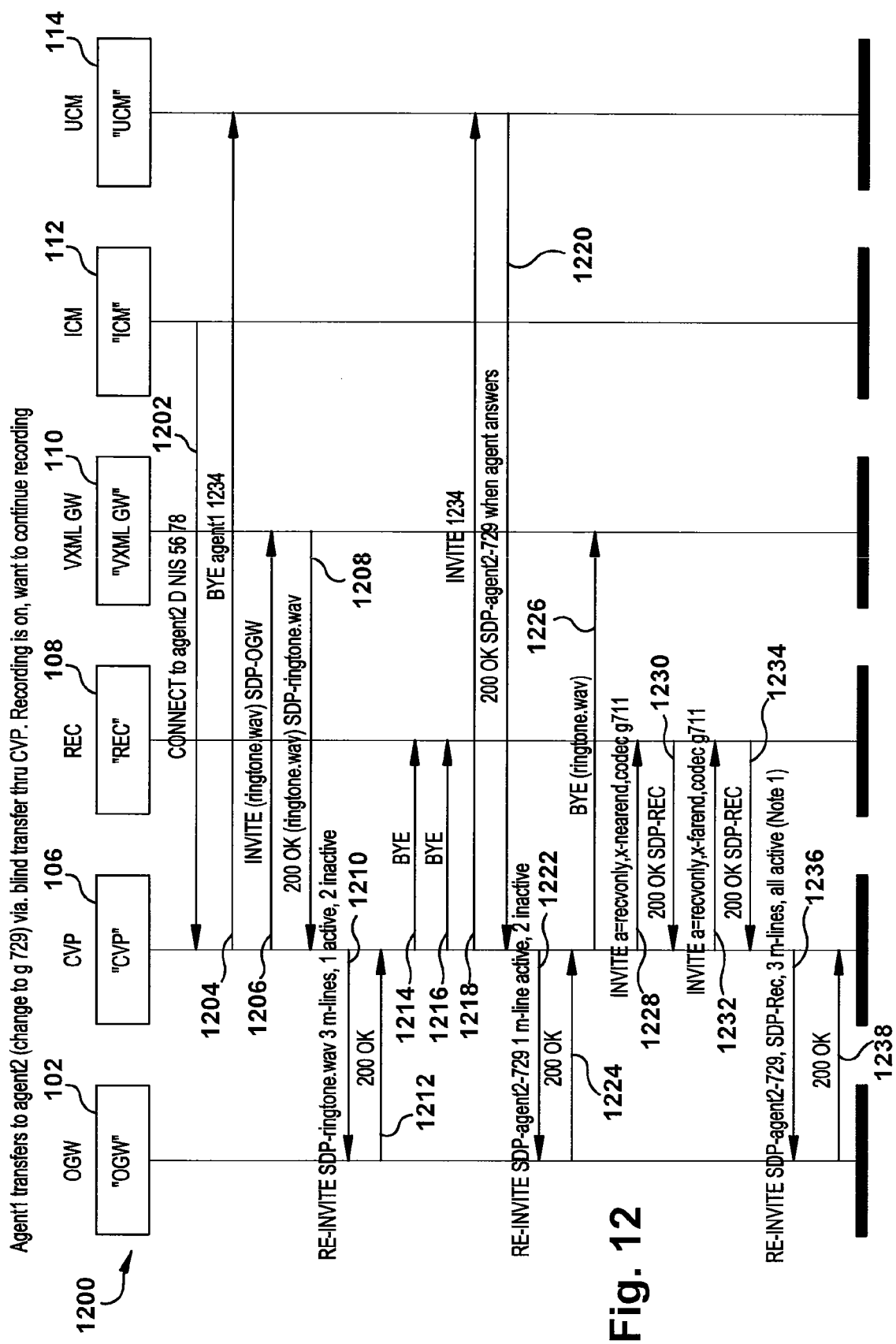
FIG. 12 is an example of a signal diagram illustrating signals exchanged when a first agent blind transfers a call to a second agent, the caller wants to continue recording and the main stream codec is changed.

FIG. 12 is an example of a signal diagram 1200 illustrating signals exchanged when a first agent blind transfers a call to a second agent, the caller wants to continue recording and the main stream codec is changed. This illustration assumes that a call between the caller and first agent has already been established. This example assumes that the call was originally setup with g711 codecs as illustrated in FIG. 3.

ICM 112 signals CVP 106 to connect to the second agent (agent 2 in this example) via signal 1202. CVP 106 responds with a BYE to the first agent (agent 1234 in this example) to UCM 114.

CVP 106 invites VXML gateway 110 to play the wave file (ringtone.wav) so that the caller hears a ring tone. CVP 106 sends INVITE 1206 to VXML gateway 110. INVITE 1206 contains the wave file (ringtone.wav) to play and informs VXML gateway 110 that the originating gateway (SDP-OGW) is gateway 102. VXML gateway 110 responds with "200 OK" 1208 and the SDP ringtone.wav. CVP 106 sends RE-INVITE 716 to gateway 102 with the ringtone file (ringtone.wav) and data informing gateway 102 that the forked media is inactive (for example by including 2 inactive m-lines in SDP data, e.g. a=inactive). Gateway 102 responds with "200 OK" signal 1212. CVP 106 sends to BYE signals 1214, 1216 to recording server 108 to turn off recording while the call is transferred.

CVP 106 sends INVITE 1218 to the Unified Call Manager (UCM) 114 to invite the second agent. UCM 114 responds with "200 OK" 1220 along with data about the agent (SDP-agent2) when the second agent answers the call. INVITE 1218 also comprises data indicating that agent2 uses a different codec (g729).

CVP 106 sends RE-INVITE 1222 (SDP-Agent) to gateway 102 responsive to the new agent answering. In this example, RE-INVITE 1222 also contains data indicating that recording is still inactive (for example forked m-lines inactive), and data indicating that the second agent is using a g729 codec. Gateway 102 responds with "200 OK" 1224. CVP 106 then sends SIP BYE 1226 to VXML gateway 110 to turn off the mid-call ringtone.

CVP 106 sends two INVITE's 1228, 1232 to recording server 108, one invite 1228 for the caller stream and one invite 1232 for the called party stream. For each INVITE, the recording server returns a "200 OK", 1230, 1234 respectively. In addition, signals 1230, 1234 may include data indicating the IP address, port and codec for the call (SDP-REC). In this example, INVITEs 1228, 1232 also indicate to use the g711 codec for the forked media streams. This is because the caller is using a g711 codec.

CVP 106 sends a RE-INVITE 1236 to gateway 102 (the originating gateway or OGW) containing data (for example SDP-agent2, SDP-REC, 3 active m-lines) to instruct gateway 102 to commence media forking. In an example embodiment, the first m-line would comprise data indicating a g729 codec and the next two m-lines are for the forked media streams (g711 codec). Gateway 102 acknowledges the RE-INVITE by sending "200 OK" 1238.

Figure 13:
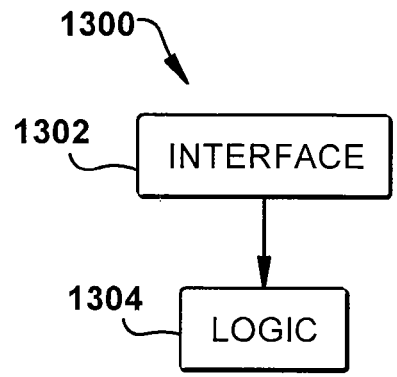
FIG. 13 illustrates an example apparatus for implementing an example embodiment.

FIG. 13 illustrates an example apparatus 1300 for implementing an example embodiment. Apparatus 1300 is suitable for implementing the functionality of gateway 102, CVP 106, recording server 108, VXML gateway 110 and/or ICM 112 (FIGS. 1-12). Apparatus 1300 suitably comprises an interface 1302 coupled to logic 1304.

Interface 1302 is used for communicating with external devices. For example if apparatus 1300 is being employed to implement gateway 102, interface 1302 would be coupled to the network enabling gateway 102 to communicate with CVP 106, Recording Server 108 and/or VXML gateway 110. In an example embodiment, interface 1302 is a wired interface, whereas in another example embodiment interface 1302 may be a wireless interface. In an example embodiment, interface 102 may suitably comprise a plurality of interfaces. For example, for implementing gateway 102, interface 102 may comprise a first interface for communicating with the caller on a packet switched telephone network (PSTN) and a second interface for communicating with CVP 106, recording server 108, and/or VXML gateway 110. Interface 102 may be configured to support any protocol such as Ethernet, IP, 802.11, etc.)

Logic 1302 implements the functionality of the device. For example, if apparatus 1300 is used for implementing gateway server 102 (FIGS. 1-12), logic 1302 performs the functionality for gateway server 102 described herein (FIGS. 1-12). As another example, if apparatus 1300 is used for implementing Customer Voice Portal (CV) 106 (FIGS. 1-12), logic 1302 performs the functionality for CVP 106 described herein (FIGS. 1-12). "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software, which performs the functionality when executed by a processor.

Figure 14:
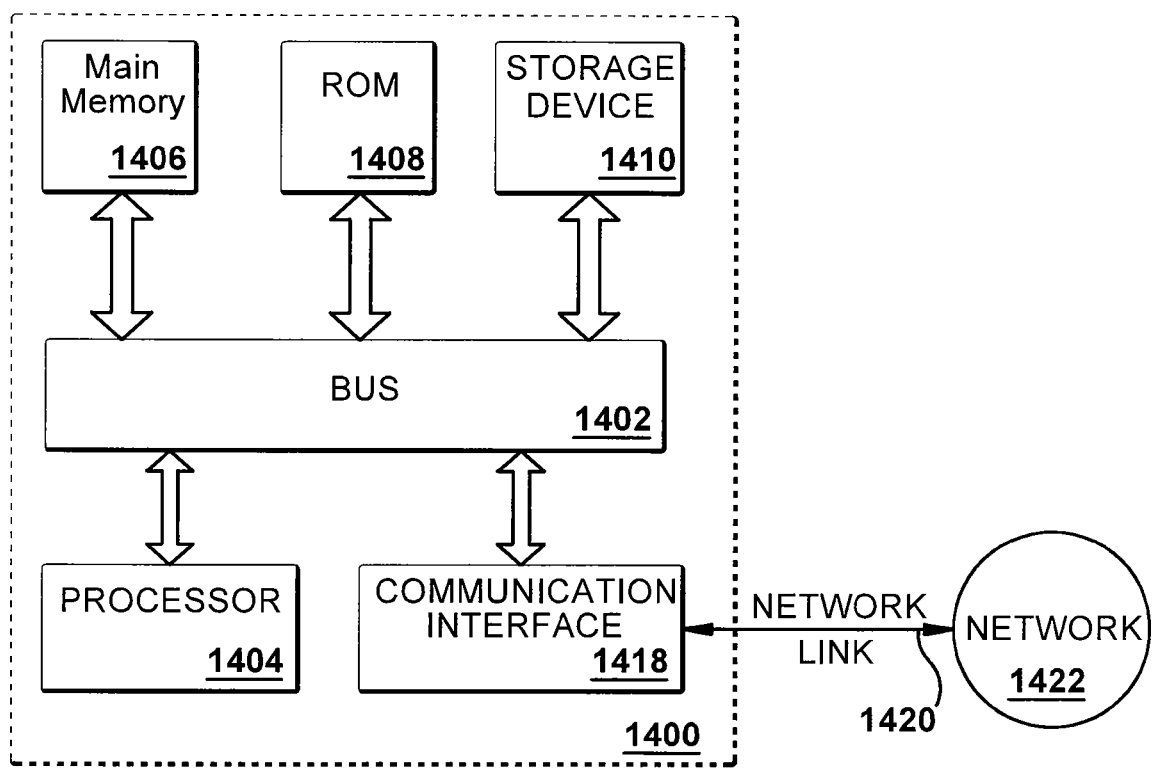
FIG. 14 illustrates an example of a computer system upon which an example embodiment may be implemented.

FIG. 14 illustrates an example of a computer system 1400 upon which an example embodiment may be implemented. Computer system 1400 may be employed to implement any of apparatus 1300 (FIG. 13), gateway 102, CVP 106, recording server 108, VXML gateway 110 and/or ICM 112 (FIGS. 1-12).

Computer system 1400 includes a bus 1402 or other communication mechanism for communicating information and a processor 1404 coupled with bus 1402 for processing information. Computer system 1400 also includes a main memory 1406, such as random access memory (RAM) or other dynamic storage device coupled to bus 1402 for storing information and instructions to be executed by processor 1404. Main memory 1406 also may be used for storing a temporary variable or other intermediate information during execution of instructions to be executed by processor 1404. Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

An aspect of the example embodiment is related to the use of computer system 1400 for media forking. According to an example embodiment, media forking is provided by computer system 1400 in response to processor 1404 executing one or more sequences of one or more instructions contained in main memory 1406. Such instructions may be read into main memory 1406 from another computer-readable medium, such as storage device 1410. Execution of the sequence of instructions contained in main memory 1406 causes processor 1404 to perform the process steps described herein. One or more processors in a multi-processing arrangement may also be employed to execute the sequences of instructions contained in main memory 1406. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 1404 for execution. Such a medium may take many forms, including but not limited to non-volatile media and volatile media. Non-volatile media include for example optical or magnetic disks, such as storage device 1410. Volatile media include dynamic memory such as main memory 1406. Common forms of computer-readable media include for example floppy disk, a flexible disk, hard disk, magnetic cards, paper tape, any other physical medium with patterns of holes, a RAM, a PROM, an EPROM, a FLASH-PROM, CD, DVD or any other memory chip or cartridge, or any other medium from which a computer can read.

Various forms of computer-readable media may be involved in carrying one or more sequences of one or more instructions to processor 1404 for execution. For example, the instructions may initially be borne on a magnetic disk of a remote computer. The remote computer can load the instructions into its dynamic memory and send the instructions using a modem. A modem local to computer system 1400 can receive the data and use an infrared transmitter to convert the data to an infrared signal. An infrared detector coupled to bus 1402 can receive the data carried in the infrared signal and place the data on bus 1402. Bus 1402 carries the data to main memory 1406 from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling computer system 1400 to a network link 1420 that is connected to a network 1422. For example, communication interface 1418 may be a local area network (LAN) card to provide a data communication connection to a compatible LAN. As another example, communication interface 1418 may be an integrated services digital network (ISDN) card or a modem to provide a data communication connection to a corresponding type of telephone line. Wireless links may also be implemented. In any such implementation, communication interface 1418 sends and receives electrical, electromagnetic, or optical signals that carry digital data streams representing various types of information.

Figure 15:
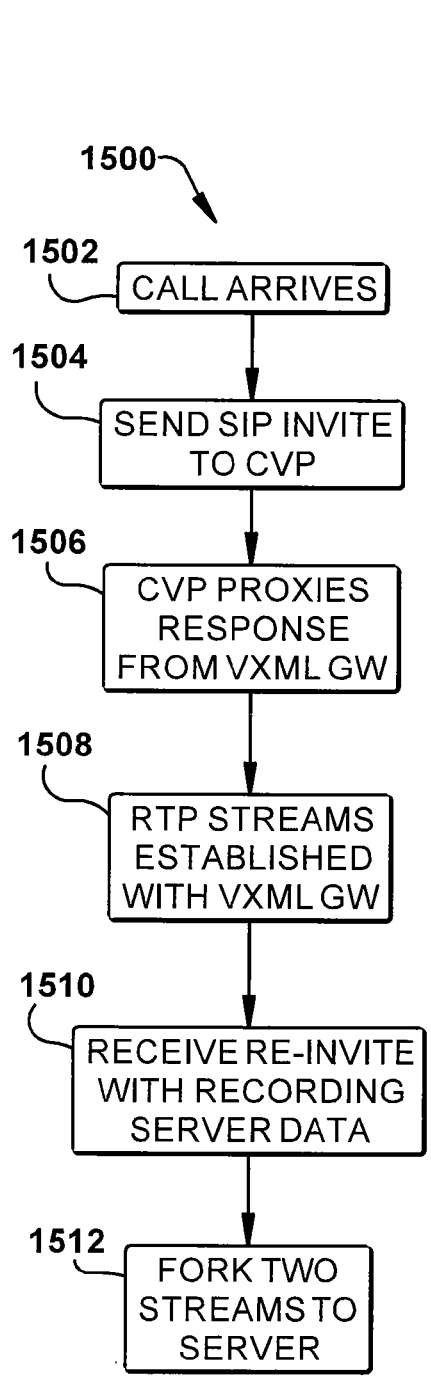
FIG. 15 illustrates an example of a methodology employed by a gateway server to implement media forking.
Figure 16:
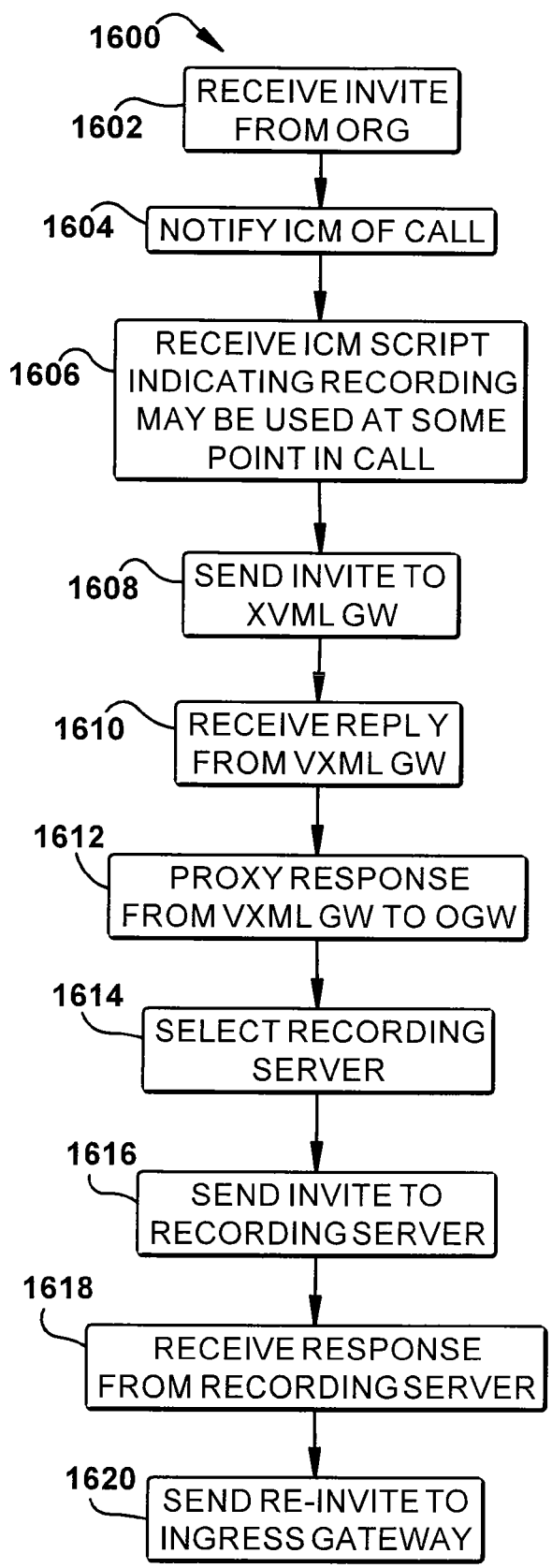
FIG. 16 illustrates an example of a methodology employed by a customer voice portal (CVP) to implement media forking.

In view of the foregoing structural and functional features described above, methodologies in accordance with example embodiments will be better appreciated with reference to FIGS. 15 and 16. While, for purposes of simplicity of explanation, the methodologies of FIGS. 15 and 16 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement the methodologies in accordance with an aspect an example embodiment. The methodologies described herein are suitably adapted to be implemented in hardware, software, or a combination thereof.

FIG. 15 illustrates an example of a methodology 1500 employed by a gateway server to implement media forking. In this example, the gateway server implementing methodology 1500 is the ingress gateway (for example gateway 102 in FIG. 1).

At 1502, a call arrives at the ingress gateway. The call may be initiated by a caller dialing a telephone number. The call may have originated on a packet switched telephone network (PSTN) or on an Internet Protocol (IP) network.

At 1504, the gateway sends a SIP INVITE message to the Customer Voice Portal. At 1506, the gateway receives a "200 OK" message from CVP. The CVP proxies for the Voice XML gateway (VXML gateway). In an example embodiment, the "200 OK" message further comprises data representative of an IP address and port for the VXML gateway.

At 1508, a stream is established between the caller and the VXML gateway through the originating gateway (OGW). In an example embodiment, the stream is a Real Time Protocol or "RTP" stream.

At 1510, the gateway receives a RE-INVITE message with data that enables the gateway to fork media streams to a recording server. In an example embodiment, the RE-INVITE comprises 3 SDP m-lines. The first m-line is the original m-line for the called party SDP. The second m-line comprises an IP address, port and codec on the recording server expecting to receive the caller's voice (audio data). The third m-line comprises an IP address, port and codec on the recording server expecting to receive the called party's voice (audio data).

At 1512 the gateway begins forking the media to the recording server. In an example embodiment, the gateway forks two separate RTP streams to the recording server. One stream is the caller's voice, and one stream is the called party's voice.

FIG. 16 illustrates an example of a methodology 1600 employed by a customer voice portal (CVP) to implement media forking. As will be described herein, when the CVP is informed that a call may need to be recorded (either immediately or potentially at a future time), the CVP selects a recording server for the call, acquires data from the selected recording to enable the gateway to send recorded streams to the recording server, and communicates the data from the selected recording server to the gateway.

At 1602, the CVP receives an INVITE from the originating gateway (which may also be referred to as the ingress gateway). The INVITE informs the CVP that a new call is being requested by a caller coupled to the originating (ingress) gateway.

At 1604, the CVP notifies the ICM of the new call. In an example embodiment the CVP sends a GED (GeoTel Engineering Document. An API (Application Programming Interface) for integrating ACDs (Automatic Call Distributors), IVRs, (Interactive Voice Responses) and agents into the ICM.) formatted new call message to the ICM.

At 1606, the CVP receives an ICM script indicating that recording may be used at some point in the call. This will insure that Digital Signal Processor (DSP) resources are reserved for recording. In particular embodiments, the ICM script may indicate to start recording as well.

At 1608, the CVP sends an INVITE to a Voice Extensible Markup Language (VXML) gateway to setup a stream (such as a RTP stream) between the gateway and the VXML gateway. At 1610, the CVP receives a reply from the VXML gateway. In an example embodiment, the reply includes an IP address and port for the VXML gateway. At 1612, the CVP proxies for the VXML gateway by sending a success "200 OK" message to the originating gateway. In an example embodiment, the success message further comprises the IP address and port of the VXML gateway. Note that 1608, 1610 and 1612 may be skipped in embodiments where the VXML gateway is co-located with the ingress gateway.

At 1614, the CVP selects a recording server (or recording server proxy). In an example embodiment, the recording server selection will be based on finding a recording server in its OAMP (Operations, Administration, Maintenance and Provisioning) configured list of servers which has the same location as the ingress gateway. The codec configured on the selected recording server will drive the codec selection. In an example embodiment, the recording server and codec are selected based on locations of the ingress gateway and recording server.

At 1616, the CVP sends invites to the recording server. In an example embodiment, the CVP sends two INVITE messages to the recording server, one INVITE the for the caller and one INVITE for the called party (additional INVITEs may be sent for additional parties belonging to a conference call). The INVITE messages suitably comprise data (tagging data) for locating and processing the call at a later time. For example a call id, codec, and other pertinent data for the call may be provided. As another example, tagging data may include, but is not limited to call GUID (Globally Unique Identifier), codec, whether stream is near-end (caller voice) or far-end (called party voice), ANI (Automatic Number ID), DNIS (Dialed Number Identification Service) and/or ICM router call key.

At 1618, the recording server replies. In an example embodiment, the recording server replies with "200 OK" success messages. In particular embodiments, the replies include the IP address, port listening port for each stream.

At 1620, the CVP sends data to the ingress gateway indicating the IP address, port and codec for the recording server. In an example embodiment, separate IP addresses, ports, and codecs are sent for each stream. In an example embodiment, the CVP sends a RE-INVITE message. The RE-INVITE message comprises three SDP m-lines where the first m-line comprises the original m-line for the called party SDP, the second m-line comprises the IP address, port and coded on the recording server that is expecting to receive the caller's voice (near-end), and the third m-line comprising the IP address, port, and codec on the recording server that is expecting to receive the called party's voice (far-end).

From the foregoing, one skilled in the art can appreciate that at least one of the example embodiments herein will record both the caller and called party streams and include other call data such as interactive voice response (IVR), conferencing, bridging etc. The recording will reflect the call from the caller's perspective, e.g., the recording reflects everything that the caller experiences during the call. The example embodiments described herein may be used in any environment including third party ACDs (Automatic Call Distributors). An aspect of an example embodiment described herein is that it provides SIP based recording integration with (any such as third party) recording server.

Although the example embodiments described herein are illustrated in the context of an IP telephone system, those skilled in the art should readily appreciate that these illustrations were selected merely for ease of illustration. Those skilled in the art should readily appreciate that the principles described herein are equally applicable to any type of streaming communications such as video, audiovisual, etc. Thus, this disclosure should not be construed as limited to Voice over Internet Protocol (VoIP) applications but should be broadly construed to cover any type of streaming media.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
an interface configured to send and receive data; and
logic coupled with the interface;
wherein the logic is configured to receive a Session Initiation Protocol (SIP) INVITE message via the interface from an ingress gateway to establish a call between an associated caller device operatively coupled with the ingress gateway and an associated called party device operatively coupled with the apparatus;
wherein the logic selectively forwards a new call request to intelligent contact management logic responsive to receiving the SIP INVITE message;
wherein the logic is configured to receive data from the intelligent contact management logic to connect a call between the associated caller device and the associated called party device, the data from the intelligent contact management logic further comprising data with instructions to record the call;
wherein the logic is responsive to the data with instructions to record the call to select a recording server;
wherein the logic is responsive to selecting a selected recording server to send two SIP INVITE messages to the selected recording server via the interface, the first SIP INVITE message requesting a first address for sending a near-end caller stream generated by the associated caller device for recording a near-end caller stream at the first address of the selected recording server and the second SIP INVITE message requesting a second address for sending a far-end called party stream generated by the associated called party device for recording the far-end called party stream at the second address of the selected recording server; and
wherein the logic is responsive to receiving the first and second addresses for the near-end and far-end streams respectively to send a SIP RE-INVITE message via the interface to the ingress gateway for forking and replicating at the ingress gateway the caller and called party streams for recording at the selected recording server respectively at the first and second addresses, wherein the SIP RE-INVITE message comprises three Session Description Protocol (SDP) m-lines, the first m-line comprising data representative of the called party SDP data, the second m-line comprising an Internet Protocol (IP) address, port and codec for recording the caller stream and the third m-line comprises an IP address, port and codec for recording the called party stream.

2. The apparatus set forth in claim 1, wherein the logic selects a recording server based on a location of the ingress gateway and a location of the selected recording server.

3. The apparatus set forth in claim 1, wherein the logic is configured to receive data to mask recording;
wherein the logic is further configured to send a first SIP INFO message to the recording server to mask recording of the caller stream; and wherein the logic is further configured to send a second SIP INFO message to the recording server to mask recording of the called party stream.

4. The apparatus set forth in claim 3, wherein the logic is configured to receive data to unmask recording;
wherein the logic is further configured to send a first SIP INFO message to the recording server to unmask recording of the caller stream; and
wherein the logic is further configure to send a second SIP INFO message to the recording server to unmask recording of the called party stream.

5. The apparatus set forth in claim 1, wherein the logic is configured to receive data to mute recording;
wherein the logic is further configured to send a first SIP INFO message to the recording server to stop recording the caller stream; and
wherein the logic is further configure to send a second SIP INFO message to the recording server to stop recording the called party stream.

6. The apparatus set forth in claim 5, wherein the logic is configured to receive data to unmask recording;
wherein the logic is further configured to send a first SIP INFO message to the recording server to start recording the caller stream; and
wherein the logic is further configure to send a second SIP INFO message to the recording server to start recording the called party stream.

7. The apparatus set forth in claim 1, wherein the logic is responsive to receiving a message to stop recording to send a second RE-INVITE to the ingress gateway via the interface with a first m-line comprising data indicating recording of the caller stream is in active and with a second m-line comprising data indicating recording of the called party stream is inactive;
wherein the logic is further configured to send a first BYE message to the recording server to stop recording of the caller stream; and
wherein the logic is further configured to send a second BYE message to the recording server to stop recording the called party stream.

8. The apparatus set forth in claim 7, wherein the logic is responsive to a message to start recording to send two additional Session Initiation Protocol SIP INVITE messages to the selected recording server via the interface, the first of the two additional SIP INVITE messages requesting a third address for sending a caller stream for recording and the second of the two SIP INVITE messages requesting a fourth address for sending a called party stream for recording;
wherein the logic is responsive to receiving the third and fourth address for the near-end and far-end stream respectively to send a SIP RE-INVITE message via the interface to the ingress gateway, wherein, the RE-INVITE message comprises three SDP m-lines, the first m-line comprising data representative of the called party SDP data, the second m-line comprising an Internet Protocol (IP) address, port and codec for the caller stream and the third m-line comprises an IP address, port and codec for the called party stream.

9. The apparatus set forth in claim 1, wherein the logic is responsive to receiving data indicating the call is being transferred to a second agent, and to continue recording, to send a second RE-INVITE to the ingress gateway with two SDP m-lines comprising data indicating that recording of the caller stream and called party stream is inactive;
wherein the logic is further configured to send first and second BYE messages to the recording server to discontinue recording of the call;

wherein the logic is further configured to send a SIP INVITE message to the second agent;
wherein the logic is further configured to receive a SIP success message in response to the INVITE to the second agent;
wherein the logic is further configured to send a first INVITE to the selected recording server to establish a recording session with the selected recording server to acquire data for recording the caller stream responsive to receiving the SIP success message;
wherein the logic is further configured to send a second INVITE to the selected recording server to establish a recording session with the selected recording server to acquire data for the called party stream responsive to receiving the SIP success message; and
wherein the logic is further configured to send a third SIP RE-INVITE message to the ingress gateway, the third RE-INVITE message comprising data representative of a destination address on recording server for receiving a forked caller stream and data representative of a destination address on recording server for receiving a forked called party stream.

10. The apparatus set forth in claim 1, wherein the logic is responsive to receiving data indicating the call is being transferred to a second agent, and to discontinue recording, to send a second RE-INVITE to the ingress gateway with two SDP m-lines comprising data indicating that recording of the caller stream and called party stream is inactive;
wherein the logic is further configured to send first and second BYE messages to the recording server to discontinue recording of the call;
wherein the logic is further configured to send a SIP INVITE message to the second agent;
wherein the logic is further configured to receive a SIP success message in response to the INVITE to the second agent;
wherein the logic is further configured to send a third SIP RE-INVITE message to the ingress gateway, the third RE-INVITE message comprising SDP data comprising m-lines comprising data indicating that recording of the caller stream and called party stream is inactive.

11. Logic encoded in a non-transitory, tangible computer readable medium for execution by an associated processor, and when executed operable to:
receive a Session Initiation Protocol (SIP) INVITE message via an interface from an ingress gateway to establish a call between an associated caller device operatively coupled with the ingress gateway and an associated called party device;
forward a new call request to intelligent contact management logic responsive to receiving the SIP INVITE message;
receive data from the intelligent contact management logic to connect a call between the associated caller device and the associated called party device, the data from the intelligent contact management logic further comprising data with instructions to record the call;
select a recording server responsive to the data with instructions to record the call;
responsive to selecting a selected recording server, send two SIP INVITE messages to the selected recording server via the interface, the first SIP INVITE message requesting a first address for sending a near-end caller stream generated by the associated caller device for recording a near-end caller stream at the first address of the selected recording server and the second SIP INVITE message requesting a second address for sending a far-end called party stream generated by the associated called party device for recording the far-end called party stream at the second address of the selected recording server; and responsive to receiving the first and second addresses for the near-end and far-end streams respectively, send a SIP RE-INVITE message via the interface to the ingress gateway for forking and replicating at the ingress gateway the caller and called party streams for recording at the selected recording server respectively at the first and second addresses, wherein the SIP RE-INVITE message comprises three Session Description Protocol (SDP) m-lines, the first m-line comprising data representative of the called party SDP data, the second m-line comprising an Internet Protocol (IP) address, port and codec for recording the caller stream and the third m-line comprises an IP address, port and codec for recording the called party stream.

12. The logic according to claim 11, further operable to:
select a recording server based on a location of the ingress gateway and a location of the selected recording server.

13. The logic according to claim 11, further operable to:
receive data to mask recording;
send a first SIP INFO message to the recording server to mask recording of the caller stream; and
send a second SIP INFO message to the recording server to mask recording of the called party stream.

14. The logic according to claim 13, further operable to:
receive data to unmask recording;
send a first SIP INFO message to the recording server to unmask recording of the caller stream; and
send a second SIP INFO message to the recording server to unmask recording of the called party stream.

15. The logic according to claim 11, further operable to:
receive data to mute recording;
send a first SIP INFO message to the recording server to stop recording the caller stream; and
send a second SIP INFO message to the recording server to stop recording the called party stream.

16. The logic according to claim 11, further operable to:
receive data to unmask recording;
send a first SIP INFO message to the recording server to start recording the caller stream; and
send a second SIP INFO message to the recording server to start recording the called party stream.

17. The logic according to claim 11, further operable to:
responsive to receiving a message to stop recording, send a second RE-INVITE to the ingress gateway via the interface with a first m-line comprising data indicating recording of the caller stream is in active and with a second m-line comprising data indicating recording of the called party stream is inactive;
send a first BYE message to the recording server to stop recording of the caller stream; and
send a second BYE message to the recording server to stop recording the called party stream.

18. The logic according to claim 17, further operable to:
responsive to a message to start recording, send two additional Session Initiation Protocol SIP INVITE messages to the selected recording server via the interface, the first of the two additional SIP INVITE messages requesting a third address for sending a caller stream for recording and the second of the two SIP INVITE messages requesting a fourth address for sending a called party stream for recording;
responsive to receiving the third and fourth address for the near-end and far-end stream respectively, send a SIP RE-INVITE message via the interface to the ingress gateway, wherein the RE-INVITE message comprises three SDP m-lines, the first m-line comprising data representative of the called party SDP data, the second m-line comprising an Internet Protocol (IP) address, port and codec for the caller stream and the third m-line comprises an IP address, port and codec for the called party stream.

19. The logic according to claim 11, further operable to:
responsive to receiving data indicating the call is being transferred to a second agent and to continue recording, send a second RE-INVITE to the ingress gateway with two SDP m-lines comprising data indicating that recording of the caller stream and called party stream is inactive;
send first and second BYE messages to the recording server to discontinue recording of the call;
send a SIP INVITE message to the second agent;
receive a SIP success message in response to the INVITE to the second agent;
send a first INVITE to the selected recording server to establish a recording session with the selected recording server to acquire data for recording the caller stream responsive to receiving the SIP success message;
send a second INVITE to the selected recording server to establish a recording session with the selected recording server to acquire data for the called party stream responsive to receiving the SIP success message; and
send a third SIP RE-INVITE message to the ingress gateway, the third RE-INVITE message comprising data representative of a destination address on recording server for receiving a forked caller stream and data representative of a destination address on recording server for receiving a forked called party stream.

20. The logic according to claim 11, further operable to:
responsive to receiving data indicating the call is being transferred to a second agent and to discontinue recording, send a second RE-INVITE to the ingress gateway with two SDP m-lines comprising data indicating that recording of the caller stream and called party stream is inactive;
send first and second BYE messages to the recording server to discontinue recording of the call;
send a SIP INVITE message to the second agent;
receive a SIP success message in response to the INVITE to the second agent;
send a third SIP RE-INVITE message to the ingress gateway, the third RE-INVITE message comprising SDP data comprising m-lines comprising data indicating that recording of the caller stream and called party stream is inactive.

21. A method, comprising:
receiving a Session Initiation Protocol (SIP) INVITE message via an interface from an ingress gateway to establish a call between an associated caller device operatively coupled with the ingress gateway and an associated called party device;
forwarding a new call request to intelligent contact management logic responsive to receiving the SIP INVITE message;
receiving data from the intelligent contact management logic to connect a call between the associated caller device and the associated called party device, the data from the intelligent contact management logic further comprising data with instructions to record the call;
selecting a recording server responsive to the data with instructions to record the call;

responsive to selecting a selected recording server, sending two SIP INVITE messages to the selected recording server via the interface, the first SIP INVITE message requesting a first address for sending a near-end caller stream generated by the associated caller device for recording a near-end caller stream at the first address of the selected recording server and the second SIP INVITE message requesting a second address for sending a far-end called party stream generated by the associated called party device for recording the far-end called party stream at the second address of the selected recording server; and responsive to receiving the first and second addresses for the near-end and far-end streams respectively, sending a SIP RE-INVITE message via the interface to the ingress gateway for forking and replicating at the ingress gateway the caller and called party streams for recording at the selected recording server respectively at the first and second addresses, wherein the SIP RE-INVITE message comprises three Session Description Protocol (SDP) m-lines, the first m-line comprising data representative of the called party SDP data, the second m-line comprising an Internet Protocol (IP) address, port and codec for recording the caller stream and the third m-line comprises an IP address, port and codec for recording the called party stream.

22. The method according to claim 21, further comprising:
selecting a recording server based on a location of the ingress gateway and a location of the selected recording server.

23. The method according to claim 21, further comprising:
receiving data to mask recording;
sending a first SIP INFO message to the recording server to mask recording of the caller stream; and
sending a second SIP INFO message to the recording server to mask recording of the called party stream.

24. The method according to claim 23, further comprising:
receiving data to unmask recording;
sending a first SIP INFO message to the recording server to unmask recording of the caller stream; and
sending a second SIP INFO message to the recording server to unmask recording of the called party stream.

25. The method according to claim 21, further comprising:
receiving data to mute recording;
sending a first SIP INFO message to the recording server to stop recording the caller stream; and
sending a second SIP INFO message to the recording server to stop recording the called party stream.

26. The method according to claim 21, further comprising:
receiving data to unmask recording;
sending a first SIP INFO message to the recording server to start recording the caller stream; and
sending a second SIP INFO message to the recording server to start recording the called party stream.

27. The method according to claim 21, further comprising:
responsive to receiving a message to stop recording, sending a second RE-INVITE to the ingress gateway via the interface with a first m-line comprising data indicating recording of the caller stream is in active and with a second m-line comprising data indicating recording of the called party stream is inactive;
sending a first BYE message to the recording server to stop recording of the caller stream; and
sending a second BYE message to the recording server to stop recording the called party stream.

28. The method according to claim 27, further comprising:
responsive to a message to start recording, sending two additional Session Initiation Protocol SIP INVITE messages to the selected recording server via the interface, the first of the two additional SIP INVITE messages requesting a third address for sending a caller stream for recording and the second of the two SIP INVITE messages requesting a fourth address for sending a called party stream for recording;
responsive to receiving the third and fourth address for the near-end and far-end stream respectively, sending a SIP RE-INVITE message via the interface to the ingress gateway, wherein the RE-INVITE message comprises three SDP m-lines, the first m-line comprising data representative of the called party SDP data, the second m-line comprising an Internet Protocol (IP) address, port and codec for the caller stream and the third m-line comprises an IP address, port and codec for the called party stream.

29. The method according to claim 21, further comprising:
responsive to receiving data indicating the call is being transferred to a second agent and to continue recording, sending a second RE-INVITE to the ingress gateway with two SDP m-lines comprising data indicating that recording of the caller stream and called party stream is inactive;
sending first and second BYE messages to the recording server to discontinue recording of the call;
sending a SIP INVITE message to the second agent;
receiving a SIP success message in response to the INVITE to the second agent;
sending a first INVITE to the selected recording server to establish a recording session with the selected recording server to acquire data for recording the caller stream responsive to receiving the SIP success message;
sending a second INVITE to the selected recording server to establish a recording session with the selected recording server to acquire data for the called party stream responsive to receiving the SIP success message; and
sending a third SIP RE-INVITE message to the ingress gateway, the third RE-INVITE message comprising data representative of a destination address on recording server for receiving a forked caller stream and data representative of a destination address on recording server for receiving a forked called party stream.

30. The method according to claim 21, further comprising:
responsive to receiving data indicating the call is being transferred to a second agent and to discontinue recording, sending a second RE-INVITE to the ingress gateway with two SDP m-lines comprising data indicating that recording of the caller stream and called party stream is inactive;
sending first and second BYE messages to the recording server to discontinue recording of the call;
sending a SIP INVITE message to the second agent;
receiving a SIP success message in response to the INVITE to the second agent;
sending a third SIP RE-INVITE message to the ingress gateway, the third RE-INVITE message comprising SDP data comprising m-lines comprising data indicating that recording of the caller stream and called party stream is inactive.

\* \* \* \* \*

UNITED STATES PATENT AND TRADEMARK OFFICE
CERTIFICATE OF CORRECTION

PATENT NO. : 9,071,684 B2  
APPLICATION NO. : 12/620166  
DATED : June 30, 2015  
INVENTOR(S) : Byron et al.

Page 1 of 1

It is certified that error appears in the above-identified patent and that said Letters Patent is hereby corrected as shown below:

Specification

In Description of Example Embodiments:

Column 3, Line 48, please delete "etc)" and insert -- etc.) -- therefor;

Column 6, Line 15, please delete "CPV" and insert -- CVP -- therefor;

Column 7, Line 9, please delete "CPV" and insert -- CVP -- therefor;

Column 7, Line 14, please delete "VCP" and insert -- CVP -- therefor.

Signed and Sealed this  
First Day of December, 2015

Michelle K. Lee  
*Director of the United States Patent and Trademark Office*